United States Patent [19]

Abileah et al.

[11] Patent Number: 5,576,861
[45] Date of Patent: Nov. 19, 1996

[54] LIQUID CRYSTAL DISPLAY HAVING A RETARDER WITH 100-200NM RETARDATION AND HAVING HIGH CONTRAST VIEWING ZONE CENTERED IN POSITIVE OR NEGATIVE VERTICAL REGION

[75] Inventors: Adiel Abileah, Farmington Hills; Gang Xu, Royal Oak, both of Mich.

[73] Assignee: OIS Optical Imaging Systems, Inc., Northville, Mich.

[21] Appl. No.: 255,971

[22] Filed: Jun. 8, 1994

Related U.S. Application Data

[63] Continuation-in-part of Ser. No. 167,652, Dec. 15, 1993, and Ser. No. 235,691, Apr. 29, 1994.

[51] Int. Cl.$^6$ ............................. G02F 1/1335; G02F 1/13
[52] U.S. Cl. ................................................. 359/73; 359/102
[58] Field of Search ........................................ 359/73, 102

[56] References Cited

U.S. PATENT DOCUMENTS

| | | | |
|---|---|---|---|
| 3,900,248 | 8/1975 | Nagasaki | 359/73 |
| 4,385,806 | 5/1983 | Fergason | 359/73 |
| 4,436,379 | 3/1984 | Funada et al. | 359/53 |
| 4,632,514 | 12/1986 | Ogawa et al. | 359/68 |
| 4,652,088 | 3/1987 | Kando et al. | 359/63 |
| 4,674,841 | 6/1987 | Buzak | 359/73 |
| 4,686,519 | 8/1987 | Yoshida et al. | 359/40 |
| 4,693,562 | 9/1987 | Hasegawa et al. | 359/63 |
| 4,701,028 | 10/1987 | Clerc et al. | 359/73 |
| 4,844,569 | 7/1989 | Wada et al. | 359/73 |
| 4,852,976 | 8/1989 | Suzuki | 359/73 |
| 4,889,412 | 12/1989 | Clerc et al. | 359/73 |
| 4,957,349 | 9/1990 | Clerc et al. | 359/63 |
| 4,973,137 | 11/1990 | Kozaki | 359/74 |
| 4,984,873 | 1/1991 | Takiguchi | 359/63 |
| 4,984,874 | 1/1991 | Yamamoto et al. | 359/63 |
| 4,991,941 | 2/1991 | Kalmanash | 359/73 |
| 4,995,704 | 2/1991 | Yamamoto et al. | 359/73 |
| 5,018,839 | 5/1991 | Yamamoto et al. | 359/73 |
| 5,032,008 | 7/1991 | Yamamoto et al. | 359/73 |
| 5,071,997 | 12/1991 | Harris | 528/353 |
| 5,107,356 | 4/1992 | Castleberry | 359/63 |
| 5,124,824 | 6/1992 | Kozaki et al. | 359/73 |
| 5,132,826 | 7/1992 | Johnson et al. | 359/73 |

(List continued on next page.)

FOREIGN PATENT DOCUMENTS

| | | |
|---|---|---|
| 55-45037 | 3/1980 | Japan. |
| 3-13916 | 1/1991 | Japan. |

OTHER PUBLICATIONS

"Wide Viewing Angle LCD Using Retardation Films" by Yamagishi et al., Japan Display '89, pp. 316–319.
"The Symmetry Property of a 90 Degree Twisted Nematic Liquid Crystal Cell" by Lien.

*Primary Examiner*—Anita Pellman Gross
*Attorney, Agent, or Firm*—Myers Liniak & Berenato

[57] ABSTRACT

A normally white liquid crystal display is provided with a positively birefringent uniaxial retardation film having a retardation value of from about 100–200 nm. The retardation film is provided on one side of the liquid crystal layer, the liquid crystal being sandwiched between a pair of orientation or buffing films which orient the liquid crystal molecules adjacent thereto in predetermined directions. The optical axis of the retardation film is rotated from about 2°–20°, most preferably from about 6°–10° relative to the buffing direction on the opposite side of the liquid crystal layer. This rotation of the retardation film optical axis allows for the high contrast ratio viewing zone of the display to be shifted vertically into either the positive or negative vertical viewing region depending upon the direction of rotation of the retardation film optical axis. Alternatively, biaxial retardation films having similar retardation values may be utilized according to the teachings of this invention.

13 Claims, 15 Drawing Sheets

U.S. PATENT DOCUMENTS

| | | | |
|---|---|---|---|
| 5,138,474 | 8/1992 | Arakawa | 359/73 |
| 5,150,235 | 9/1992 | Haim et al. | 359/73 |
| 5,150,237 | 9/1992 | Iimura et al. | 359/73 |
| 5,157,529 | 10/1992 | Koopman et al. | 359/73 |
| 5,179,457 | 1/1993 | Hirataka et al. | 359/73 |
| 5,184,236 | 2/1993 | Miyashita et al. | 359/73 |
| 5,189,538 | 2/1993 | Arakawa | 359/73 |
| 5,194,975 | 3/1993 | Akatsuka et al. | 359/73 |
| 5,196,953 | 3/1993 | Yeh et al. | 359/73 |
| 5,227,903 | 7/1993 | Miyazawa et al. | 359/73 |
| 5,229,039 | 7/1993 | Ikeda et al. | 359/68 |
| 5,231,521 | 7/1993 | Johnson et al. | 359/73 |
| 5,237,438 | 8/1993 | Miyashita et al. | 359/73 |
| 5,241,408 | 8/1993 | Ishikawa et al. | 359/73 |
| 5,250,214 | 10/1993 | Kanemoto et al. | 359/63 |
| 5,344,916 | 9/1994 | Harris et al. | 528/353 |
| 5,369,513 | 11/1994 | Akatsuka et al. | 359/73 |

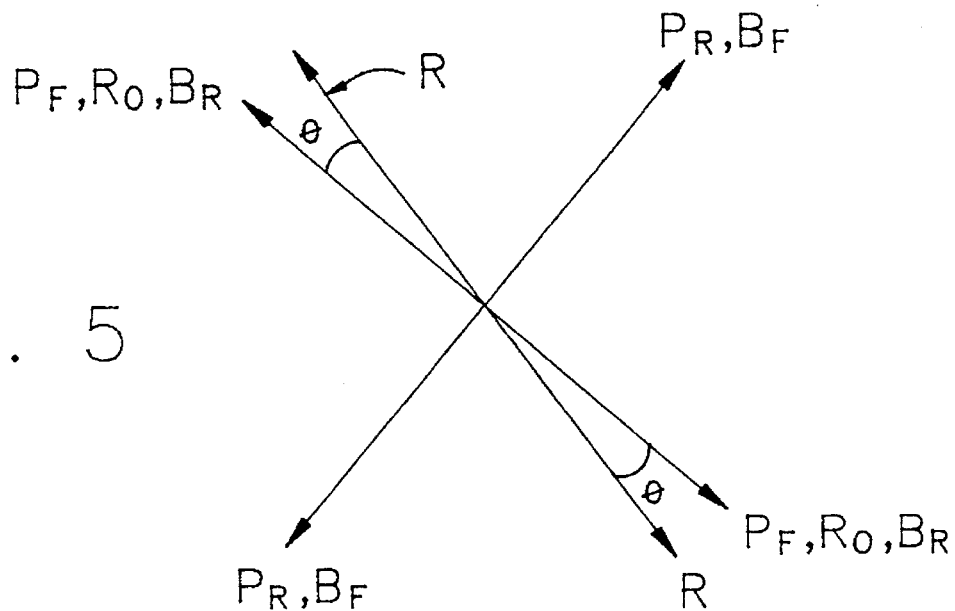
Fig. 5
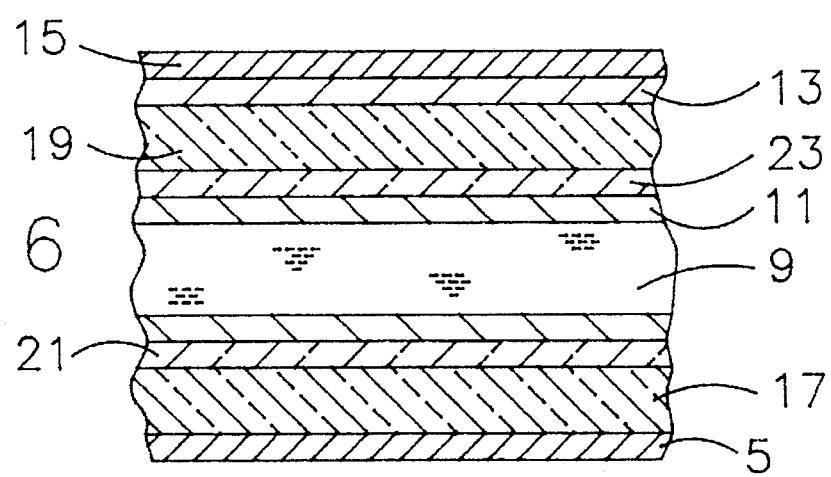
Fig. 6
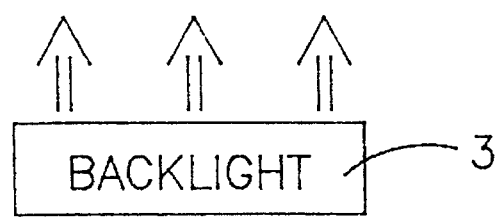

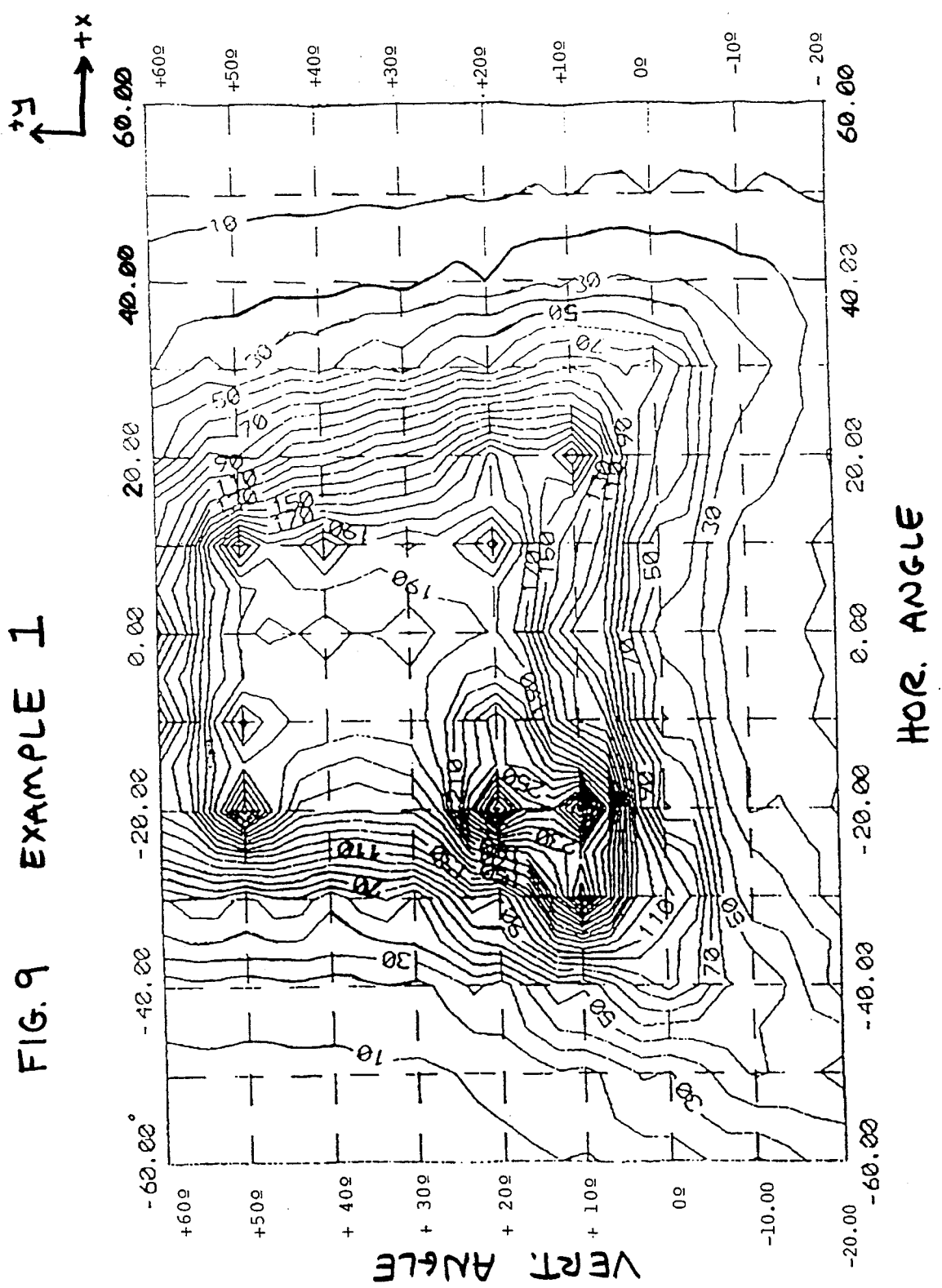
FIG. 9 EXAMPLE 1

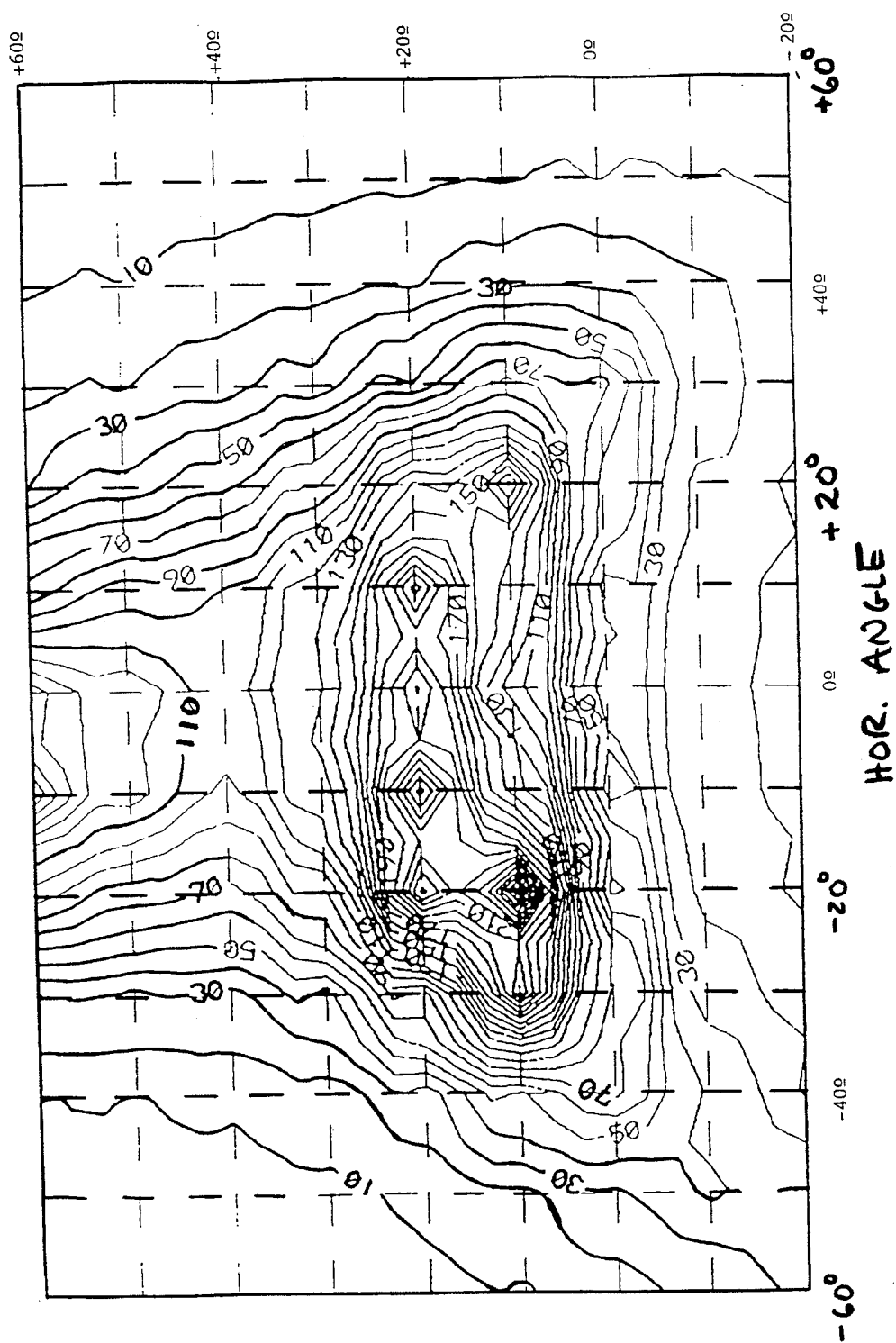
FIG. 10 EXAMPLE 1

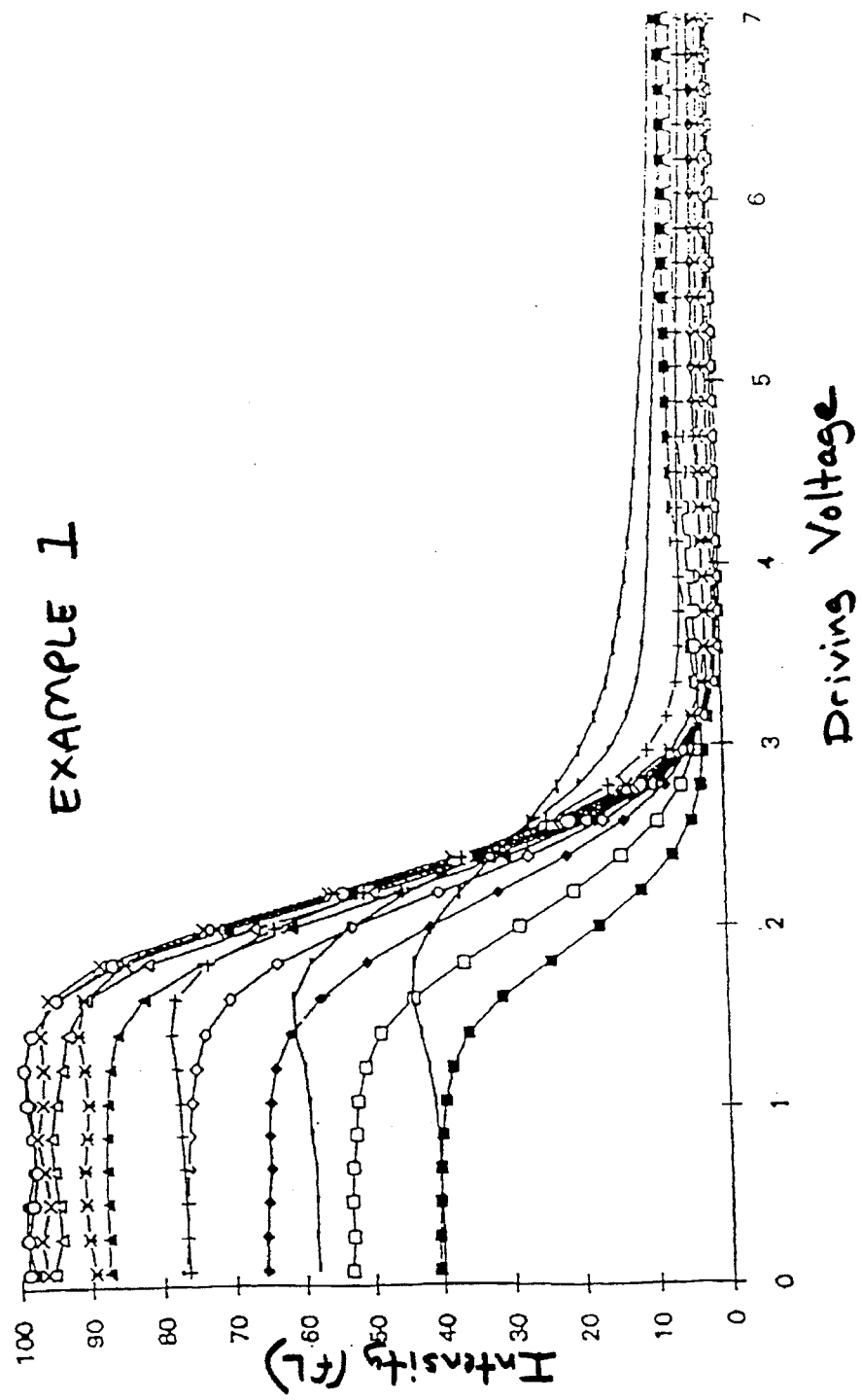

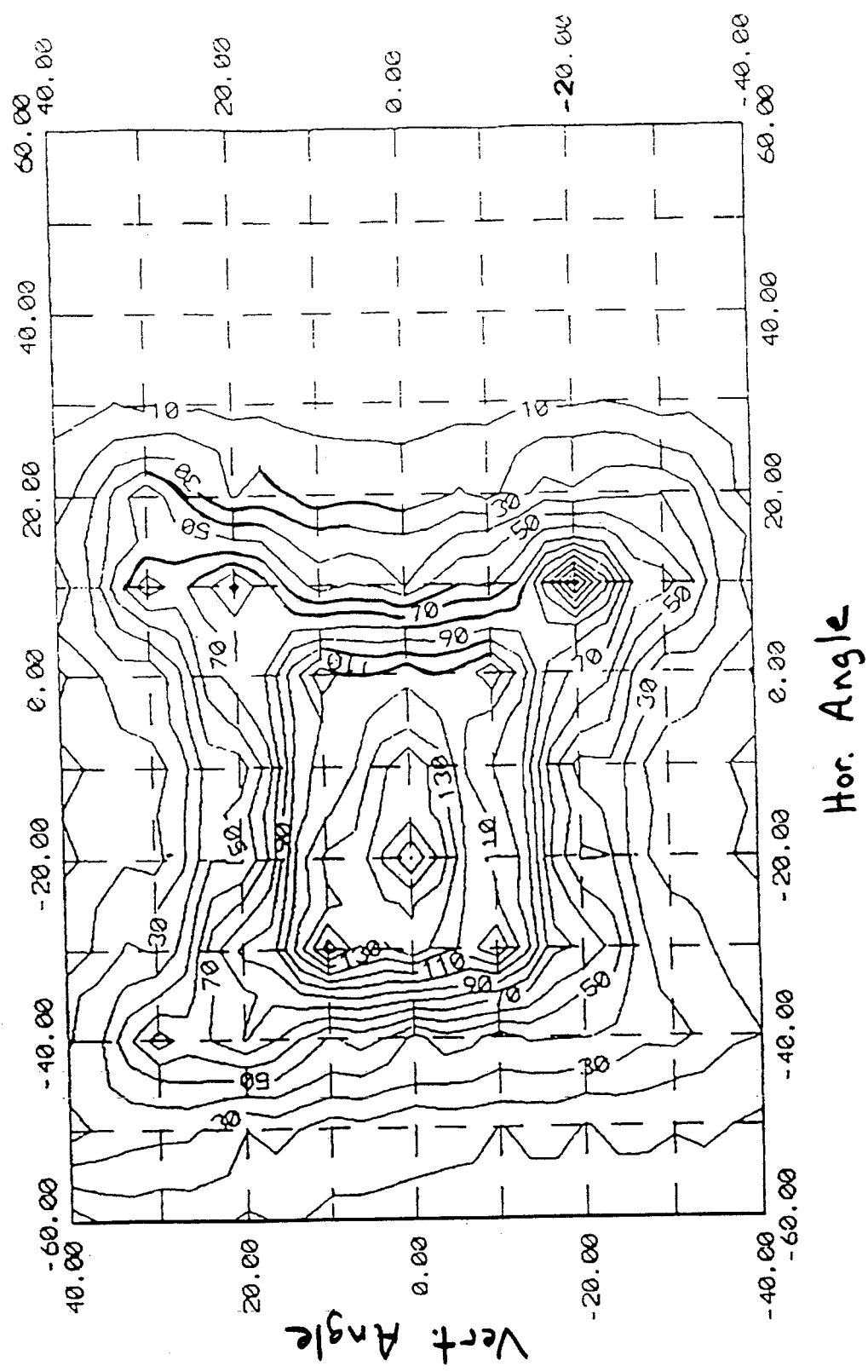
FIG. 12(a) EXAMPLE 1

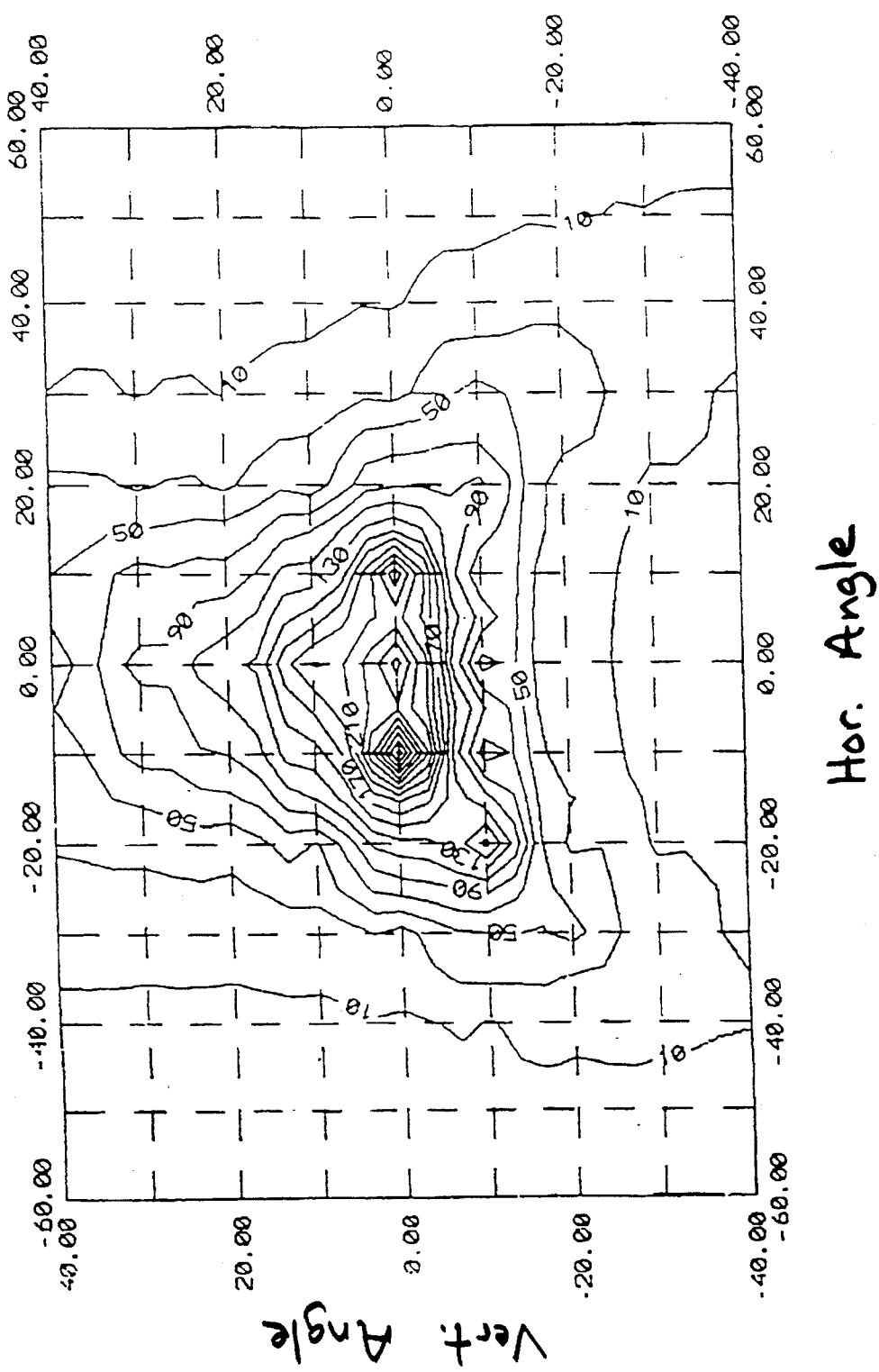
FIG. 12(b) EXAMPLE 1

FIG. 13  EXAMPLE 2
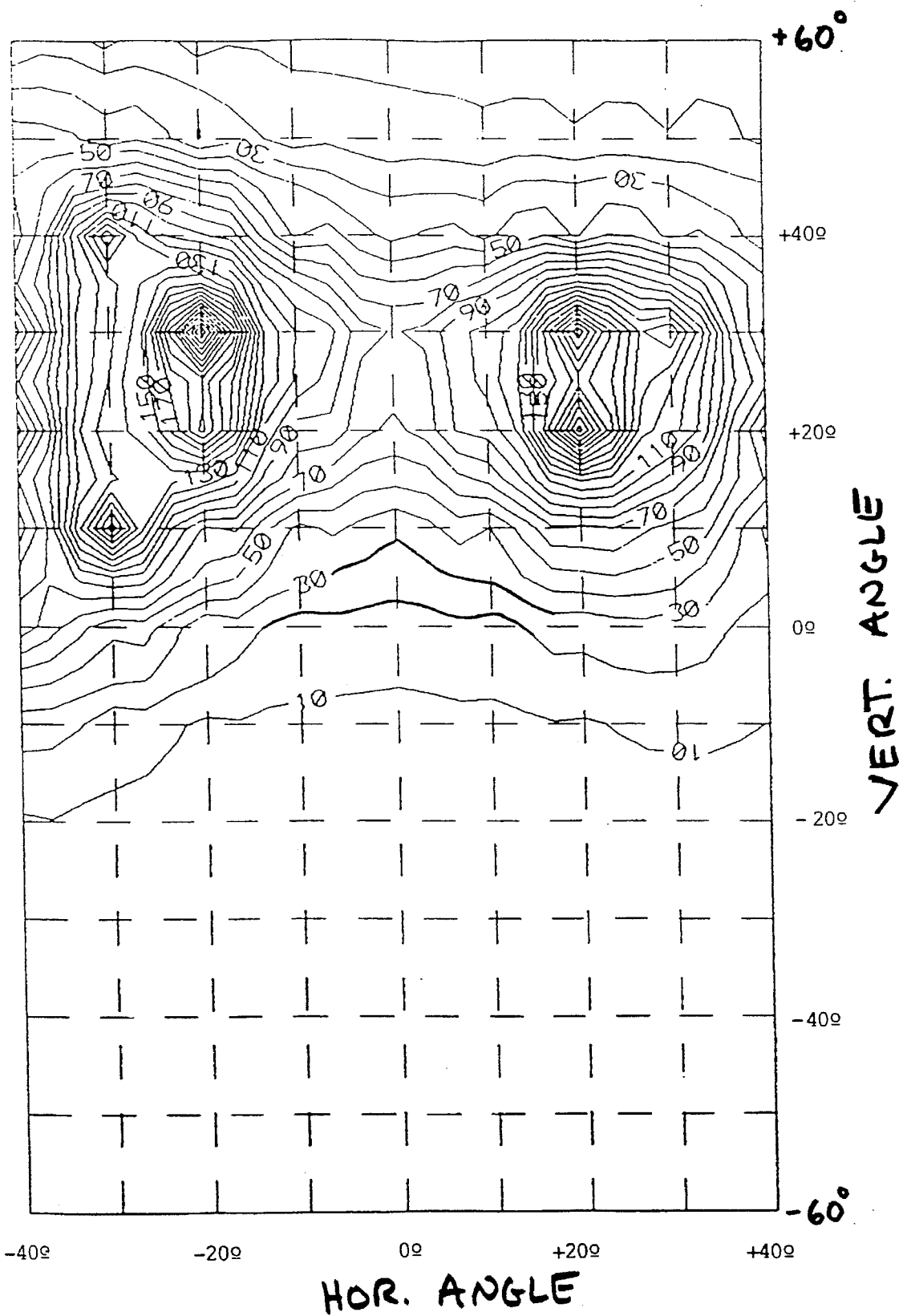

FIG. 14    EXAMPLE 2
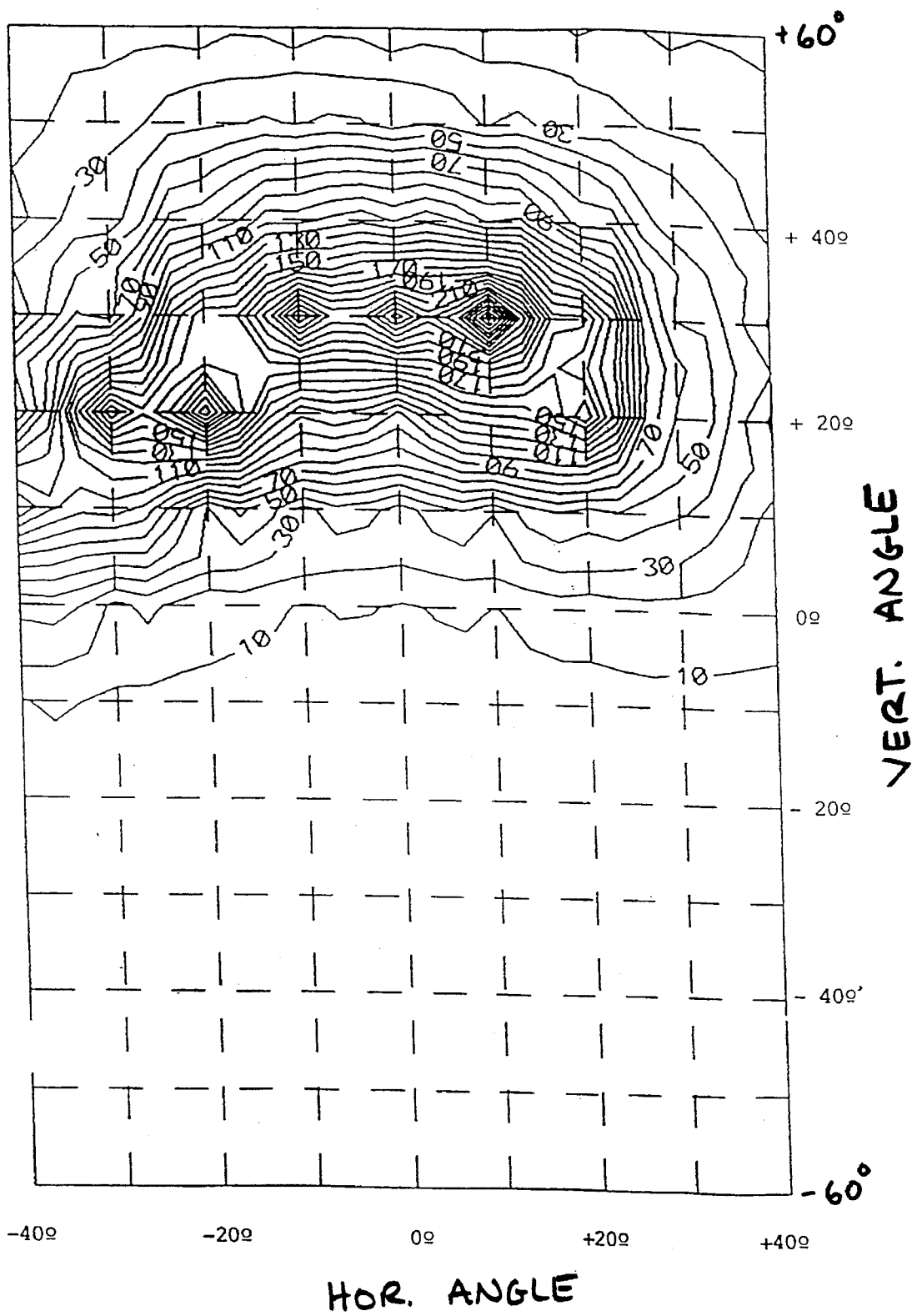

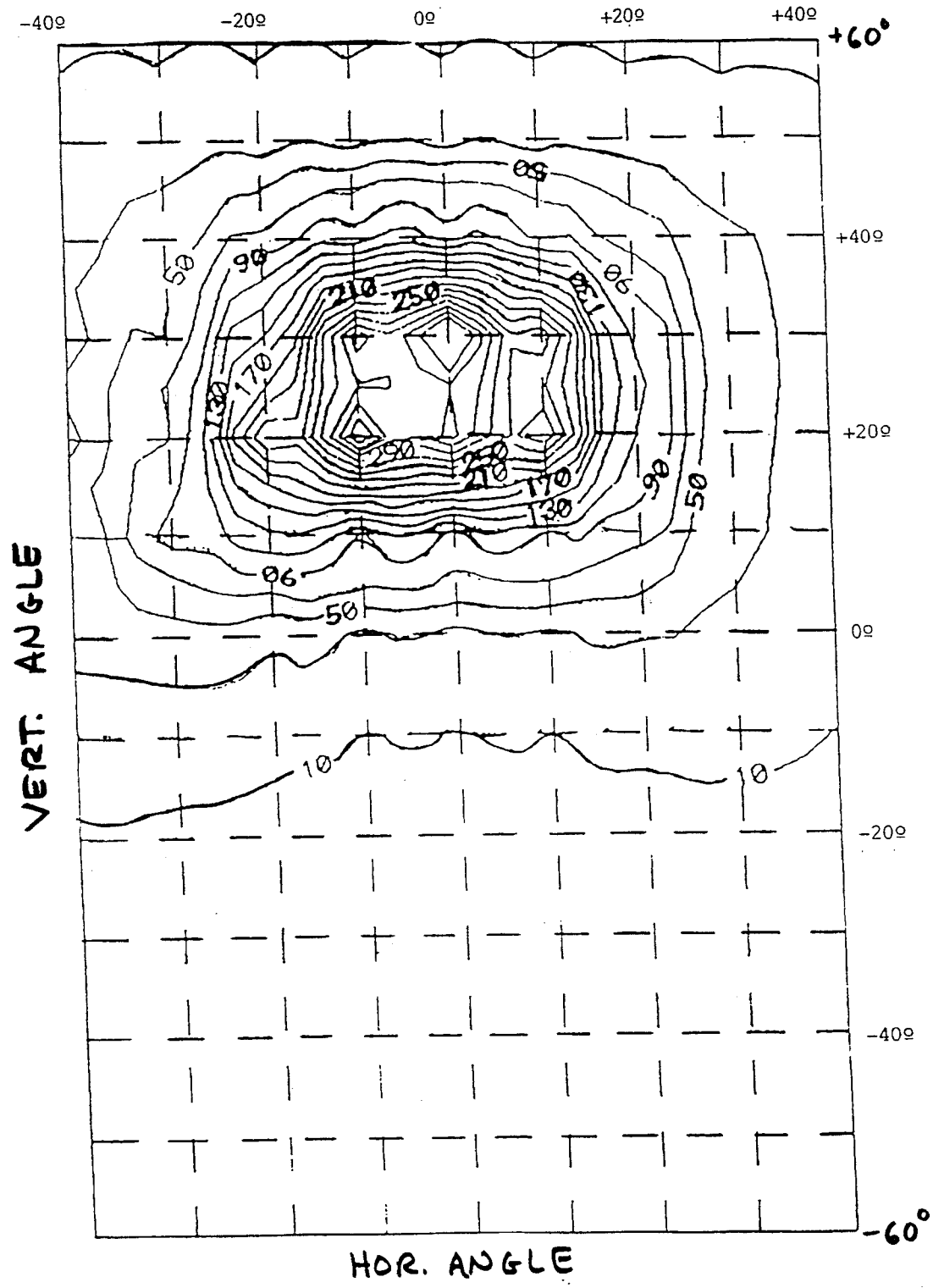
FIG. 15  EXAMPLE 3

LIQUID CRYSTAL DISPLAY HAVING A RETARDER WITH 100-200NM RETARDATION AND HAVING HIGH CONTRAST VIEWING ZONE CENTERED IN POSITIVE OR NEGATIVE VERTICAL REGION

RELATED APPLICATIONS

This is a continuation-in-part of U.S. Ser. Nos. 08/167, 652 filed Dec. 15, 1993, and 08/235,691 filed Apr. 29, 1994, the disclosures of which are hereby incorporated herein by reference.

This invention relates to a liquid crystal display having at least one retardation film. More particularly, this invention relates to a normally white liquid crystal display including a retardation film disposed on one side of the liquid crystal layer, the optical axis of the retardation film being oriented according to the manufacturer's desired specification.

BACKGROUND OF THE INVENTION

Liquid crystal materials are useful for electronic displays because light traveling through a layer of liquid crystal (LC) material is affected by the anisotropic or birefringent value ($\Delta n$) of the LC material which in turn can be controlled by the application of a voltage across the LC. Liquid crystal displays (LCDs) are commonly used in applications such as avionic cockpit displays, portable computers, calculators, etc.

Informational data in typical liquid crystal displays is presented in the form of a matrix array of rows and columns of numerals or characters which are generated by a number of segmented electrodes arranged in a matrix pattern. The segments are connected by individual leads to driving electronics which apply a voltage to the appropriate combination of segments and adjacent LC material in order to display the desired data and/or information by controlling the light transmitted through the liquid crystal material.

Contrast ratio is one of the most important attributes considered in determining the quality of both normally white (NW) and normally (NB) liquid crystal displays. The contrast ratio in a normally white display is determined in low ambient conditions by dividing the "off-state" light transmission (high intensity white light) by the "on-state" or darkened transmitted intensity. For example, if the "off-state" transmission is 200 fL at a particular viewing angle and the "on-state" transmission is 5 fL at the same viewing angle, then the display's contrast ratio at that particular viewing angle is 40 or 40:1 for the particular "on-state" driving voltage utilized.

Accordingly, in normally white LCDs the primary factor adversely limiting the contrast ratio is the amount of light which leaks through the display in the darkened or "on-state". In a similar manner, in normally black displays, the primary factor limiting the contrast ratio achievable is the amount of light which leaks through the display in the darkened or "off-state". The higher and more uniform the contrast ratio of a particular display over a wide range of viewing angles, the better the LCD.

Normally black (NB) twisted nematic displays typically have better contrast ratio contour curves or characteristics then do their counterpart NW displays in that the NB image can be seen better at large viewing angles. However, NB displays are much harder to manufacture than NW displays due to their high dependence on the cell gap or thickness "d" of the liquid crystal layer as well as on the temperature of the liquid crystal material itself. Accordingly, a long-felt need in the art has been the ability to construct a normally white display with high contrast ratios over a large range of viewing angles, rather than having to resort to the more difficult to manufacture NB display to achieve these characteristics.

What is generally needed in NW displays is an optical compensating or retarding element(s), i.e. retardation film, which introduces a phase delay that restores the original polarization state of the light, thus allowing the light to be substantially blocked by the output polarizer in the "on-state". Optical compensating elements or retarders are known in the art and are disclosed, for example, in U.S. Pat. Nos. 5,184,236, 5,196,953, 5,138,474, and 5,071,997, the disclosures of which are hereby incorporated herein by reference.

FIG. 1 is a contrast ratio curve graph for a prior art normally white twisted nematic light valve including a rear linear polarizer having a transmission axis oriented in a first direction, a front or light exit linear polarizer having a transmission axis defining a second direction wherein the first and second directions are substantially perpendicular to one another, a liquid crystal material having a cell gap "d" of about 5.86 µm and a birefringence ($\Delta n$) of about 0.084 at room temperature, a rear buffing or orientation film buffed in the second direction, and a front orientation film buffed in the first direction. The temperature at which FIG. 1 was developed was about 34.4° C. This light valve did not include a retarder.

The contrast ratio curves of FIG. 1 were plotted utilizing a 6.8 volt "on-state" driving voltage, a 0.2 volt "off-state" or $V_{OFF}$ voltage, and by conventionally backlighting the display with white light. As can be seen in FIG. 1, the viewing zone or envelope of the light valve while being fairly broad horizontally in the lower vertical region becomes narrowed or constricted in the positive vertical viewing region. For example, at positive 20° vertical, the 10:1 and greater contrast ratio region extends horizontally over only a total of about 70° while at −20° vertical, this same 10:1 contrast ratio zone extends over a horizontal total of about 100°. Therefore, because of the non-uniform or skewed shape of the viewing zone or envelope shown in FIG. 1, it is evident that viewers in the positive vertical viewing region will have difficulty viewing displayed images at medium and large horizontal viewing angles such as about ±40°. This graph is illustrative of the common problems associated with typical normally white liquid crystal displays in that their contrast ratios are limited at increased horizontal and vertical viewing angles.

FIG. 2 is a driving voltage versus intensity (fL) plot of the prior art light valve described above with respect to FIG. 1, this plot illustrating the gray level behavior of this light valve. The various curves represent horizontal viewing angles from about −60° to +60° along the 0° vertical viewing axis.

Gray level performance and the corresponding amount of inversion are important in determining the quality of an LCD. Conventional liquid crystal displays typically utilize anywhere from about 8 to 64 different driving voltages. These different driving voltages are generally referred to as "gray level" voltages. The intensity of light transmitted through the pixel(s) or display depends upon the driving voltage utilized. Accordingly, conventional gray level voltages are used to generate dissimilar shades of color so as to create different colors when, for example, the shades are mixed with one another.

Preferably, the higher the driving voltage in a normally white display, the lower the intensity (fL) of light transmitted therethrough. Likewise then, the lower the driving voltage, the higher the intensity of light reaching the viewer. The opposite is true in normally black displays. Thus, by utilizing multiple gray level driving voltages, one can manipulate either a NW or NB liquid crystal display to emit desired intensities and shades of light/color. A gray level $V_{ON}$ is generally known as any driving voltage greater than $V_{th}$ (threshold voltage) up to about 5–6.5 volts.

Gray level intensity in LCDs is dependent upon the display's driving voltage. It is desireable in NW displays to have an intensity versus driving voltage curve wherein the intensity of light emitted from the display or pixel continually and monotonically decreases as the driving voltage increases. In other words, it is desireable to have gray level performance in an NW pixel such that the intensity (fL) at 6.0 volts is less than that at 5.0 volts, which is in turn less than that at 4.0 volts, which is less than that at 3.0 volts, which is in turn less than that at 2.0 volts, etc. Such desired gray level curves across wide ranges of view allow the intensity of light reaching viewers at different viewing angles via the pixel(s) or display to be easily and consistently controlled.

Turning again to FIG. 2, the intensity versus driving voltage curves illustrated therein of the FIG. 1 light valve having no retardation film are undesireable because of the inversion humps present in the areas of the curves having driving voltages greater than about 3 or 3.2 volts. The intensity aspect of the curves monotonically decreases as the driving voltage increases in the range of from about 1.6–3.0 volts, but at a driving voltage of about 3.2 volts, the intensities at a plurality of viewing angles begin to rise as the voltage increases from about 3.2 volts up to about 6.8 volts. Such rises in intensity as the driving voltage increases are known as "inversion humps". Inversion humps lead to the display or light valve emitting different colors via the same pixel at different viewing angles for the same driving voltage. Clearly, this is undesirable. While the inversion humps of FIG. 2 include only rise portions, inversion humps often include both rise and fall portions as will be appreciated by those of ordinary skill in the art, thus enabling the "inversion humps" to actually look like humps.

A theoretically perfect driving voltage versus intensity (fL) curve for an NW display would have a decreased intensity (fL) for each increase in gray level driving voltage at all viewing angles. In contrast to this, the inversion humps of FIG. 2 represent large increases in intensity of radiation emitted from the light valve for each corresponding increase in gray level driving voltage above about 3.2 volts. Accordingly, it would satisfy a long-felt need in the art if a normally white liquid crystal display could be provided with no or little inversion.

U.S. Pat. No. 5,184,236 discloses an NW display including a pair of retardation films provided on one side of the LC layer, these retardation films having retardation values of about 300 nm or greater. The viewing characteristics of the LCDs of this patent could be improved upon with respect to contrast ratio, inversion, and uniformity as well as the position of the viewing zone by utilizing retarders of different values and orientations. Furthermore, it is felt that such improvements may be achieved with a reduced number of retardation films thus reducing the cost and complexity of the display.

The parents of this application, i.e. Ser. Nos. 08/167,652 and 08/235,691 incorporated herein by reference, provide for NW displays with a pair of retardation films having retardation values of about 80–200 nm. While the different embodiments of Ser. No. 08/167,652 and 08/235,691 provide excellent results with respect to viewing characteristics, the disclosure of this application allows improved viewing characteristics in the vertical viewing regions while sacrificing certain viewing characteristics at other viewing angles.

FIG. 3 illustrates the angular relationships between the horizontal and vertical viewing axes and angles described herein relative to a liquid crystal display and conventional LCD angles φ and θ. The +X, +Y, and +Z axes shown in FIG. 3 are also defined in other figures herein. Furthermore, the "horizontal viewing angles" (or $X_{ANG}$) and "vertical viewing angles" (or $Y_{ANG}$) illustrated and described herein may be transformed to conventional LCD angles: azimuthal angle φ; and polar angle Θ, by the following equations:

Tan $(X_{ANG})$=Cosine (φ)·Tan (Θ)

Sine $(Y_{ANG})$=Sine (Θ)·Sine (φ)

or

Cosine (φ)=Cosine $(Y_{ANG})$·Cosine $(X_{ANG})$

Tan (φ)=Tan $(Y_{ANG})$÷Sine $(X_{ANG})$

The term "rear" when used herein but only as it is used to describe substrates, polarizers, electrodes, buffing zones, and orientation films means that the described element is on the backlight side of the liquid crystal material, or in other words, on the side of the LC material opposite the viewer.

The term "front" when used herein but only as it is used to describe substrates, polarizers, electrodes, buffing zones and orientation films means that the described element is located on the viewer side of the liquid crystal material.

The LCDs and light valves herein include a liquid crystal material with a birefringence (Δn) of 0.084 at room temperature, Model No. ZLI-4718 obtained from Merck.

The term "retardation value" as used herein means "d·Δn" of the retardation film or plate, wherein "d" is the film thickness and "Δn" is the film birefringence.

The term "interior" when used herein to describe a surface or side of elements (or an element itself), means the side or surface closest to the liquid crystal material.

The term "light valve" as used herein means a liquid crystal display including a rear linear polarizer, a rear transparent substrate, a rear continuous pixel electrode, a rear orientation film, an LC layer, a front orientation film, a front continuous pixel electrode, a front substrate, and a front polarizer (without the presence of color filters and driving active matrix circuitry such as TFTs). Such a light valve may also include a retardation film(s) disposed on either side of the LC layer as described with respect to each example and embodiment herein. In other words, a "light valve" may be referred to as one giant pixel without segmented electrodes.

It is apparent from the above that there exists a need in the art for a normally white liquid crystal display wherein the viewing zone of the display has both high contrast ratios and little or no inversion over a wide range of viewing angles, the viewing zones position being shiftable to different vertical regions so as to allow viewers at such predetermined viewing angles (e.g. positive vertical viewing angles) to be able to satisfactorily view the displayed image.

This invention will now be described with respect to certain embodiments thereof, accompanied by certain illustrations wherein:

SUMMARY OF THE INVENTION

Generally speaking this invention fulfills the above-described needs in the art by providing a method of shifting the high contrast ratio viewing zone of a twisted nematic normally white liquid crystal display upward into the positive or upward vertical viewing zone, the method comprising the steps of:

a) sandwiching a twisted nematic liquid crystal layer between a pair of electrodes, the liquid crystal layer having a thickness of from about 4.5–6.5 µm;

b) orienting the liquid crystal molecules on a first side of the liquid crystal layer in a first direction;

c) orienting the liquid crystal molecules on a second side of the liquid crystal layer in a second direction, the first and second directions being different from one another in a manner such that the liquid crystal layer when in the off-state twists at least one visible wavelength of light less than about 100°;

d) providing a retardation film having a retardation value "d·Δn" in the range of about 100–250 nm on the first side of the liquid crystal layer, wherein "d" is the thickness of the retardation film and "Δn" is its birefringence;

e) rotating the optical axis of the retardation film from above 2°–20° relative to the second direction, the rotating of the optical axis shifting the high contrast viewing zone vertically so that viewers at such viewing angles may see a high contrast image with reduced inversion.

This invention further fulfills the above-described needs in the art by providing a twisted nematic liquid crystal display capable of displaying an image to a viewer, the display comprising:

a pair of electrodes sandwiching a twisted nematic liquid crystal layer therebetween, the pair of electrodes for applying a voltage across the liquid crystal layer;

first and second orientation means disposed adjacent the liquid crystal layer on opposite sides thereof, the first orientation means defining a first orientation or buffing direction and the second orientation means defining a second orientation or buffing direction, the first and second orientation directions for aligning the liquid crystal molecules of the liquid crystal layer in a predetermined manner;

a positively birefringent unaxial retardation film having a retardation value "d·Δn" in the range of about 100–200 nm, where "d" is the thickness of the retardation film and "Δn" is its birefringent value, wherein the retardation film is disposed on the same side of the liquid crystal layer as the first orientation means, the retardation film being oriented such that its optical axis is substantially parallel ± about 20° to the second orientation or buffing direction of the second orientation means thereby enabling the liquid crystal display to display to the viewer an image with improved contrast ratios and reduced inversion.

This invention further fulfills the above-described needs in the art by providing a method of making a normally white twisted nematic liquid crystal display, a method comprising the steps of:

a) sandwiching a liquid crystal layer between first and second electrodes, the liquid crystal layer having a thickness "d" of from about 4.5 to 6.5 µm;

b) providing a first orientation means between the first electrode and the liquid crystal layer, the first orientation means for orienting LC molecules of the LC layer in a first direction adjacent the first orientation means;

c) providing a second orientation means between the LC layer and the second electrode, the second orientation means for orienting LC molecules in a second direction adjacent the second orientation means;

d) disposing a positively birefringent uniaxial retardation film on the same side of the LC layer as the first electrode and first orientation means, the retardation film having a retardation value of from about 100–200 nm; and e) orientating the optical axis of the uniaxial retardation film substantially parallel ± about 20° to the second direction defined by the second orientation means whereby the normally white display exhibits improved contrast ratios and reduced inversion.

This invention will now be described with respect to certain embodiments thereof, wherein:

IN THE DRAWINGS

FIG. 5 is a top view illustrating the optical component angular relationships of the liquid crystal display of FIG. 4.

FIG. 6 is a side elevational cross-sectional view of the LCD of the first or FIGS. 4–5 embodiment of this invention.

FIG. 9 is a white light contrast ratio contour plot of the normally white Display "A" of Example 1 when a driving voltage of about 6.8 volts was applied.

FIG. 10 is a white light contrast ratio contour plot of the normally white Display "A" of Example 1 when utilizing a driving voltage of about 6.0 volts was applied.

FIG. 11 is a white light transmission (fL) versus driving voltage plot of the normally white Display "A" of Example 1, this plot illustrating the viewing characteristics at a plurality of horizontal viewing angles disposed along the 0° vertical viewing axis.

FIG. 12(a) is a white light contrast ratio contour plot of the comparative normally white Display "B" of Example 1 when a driving voltage of about 6.8 volts was applied.

FIG. 12(b) is a white light contrast ratio contour plot of the comparative NW Display "C" of Example 1 when a driving voltage of about 6 volts was applied.

FIG. 13 is a white light contrast ratio contour plot of the NW light valve of Example 2 when a driving voltage of about 5.0 volts was applied.

FIG. 14 is a white light contrast ratio contour plot of the NW light valve of Example 2 when a driving voltage of about 4.0 volts was applied.

FIG. 15 is a white light contrast ratio contour plot of the normally white AMLCD of Example 3 when a driving voltage of about 6.0 volts was applied.

DETAILED DESCRIPTION OF CERTAIN EMBODIMENTS OF THIS INVENTION

Figure 1:
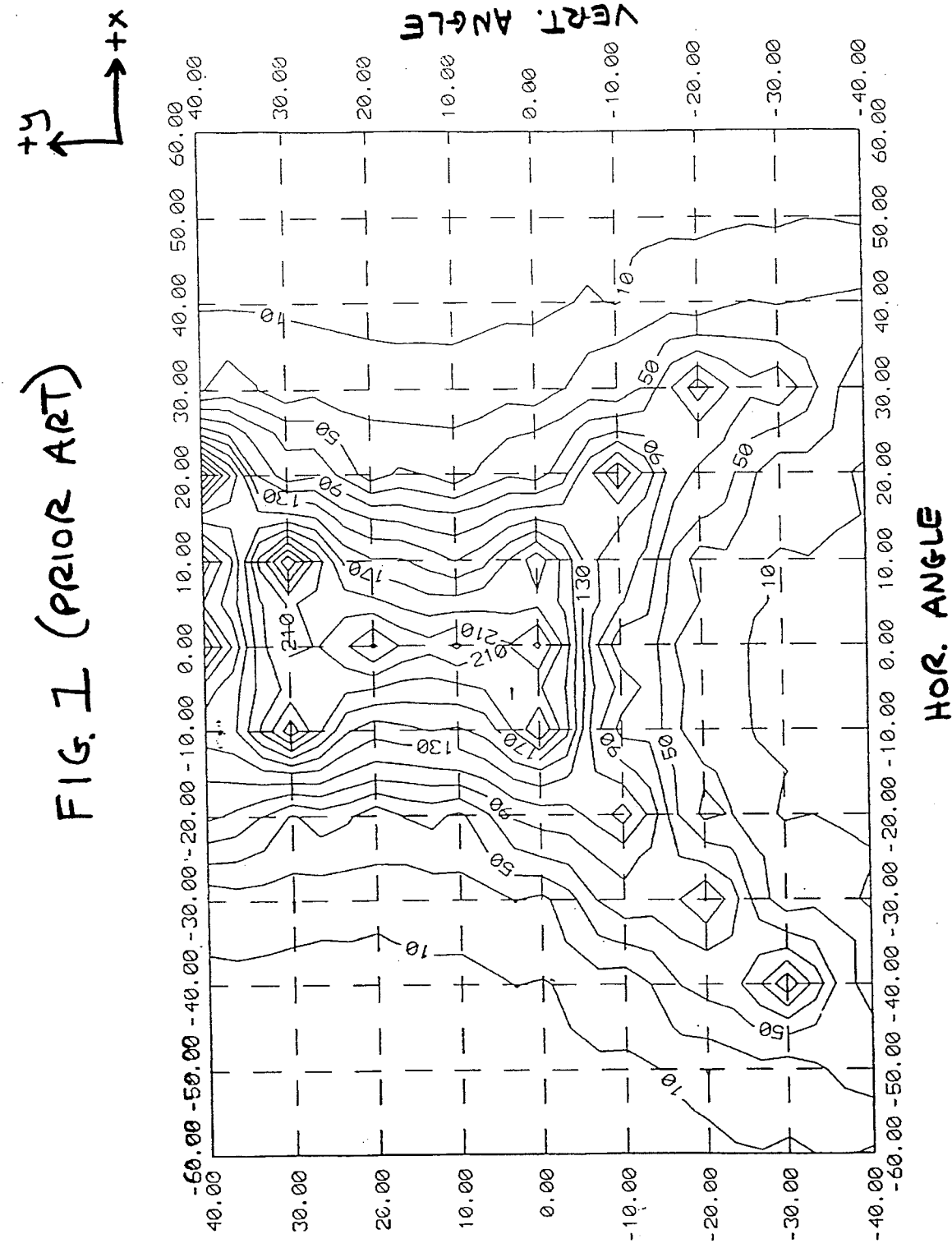
FIG. 1 is a contrast ratio plot of a prior art light valve which utilized white light and an "on-state" driving voltage of about 6.8 volts.

Referring now more particularly to the accompanying drawings in which like reference numerals indicate like parts.

Figure 4:
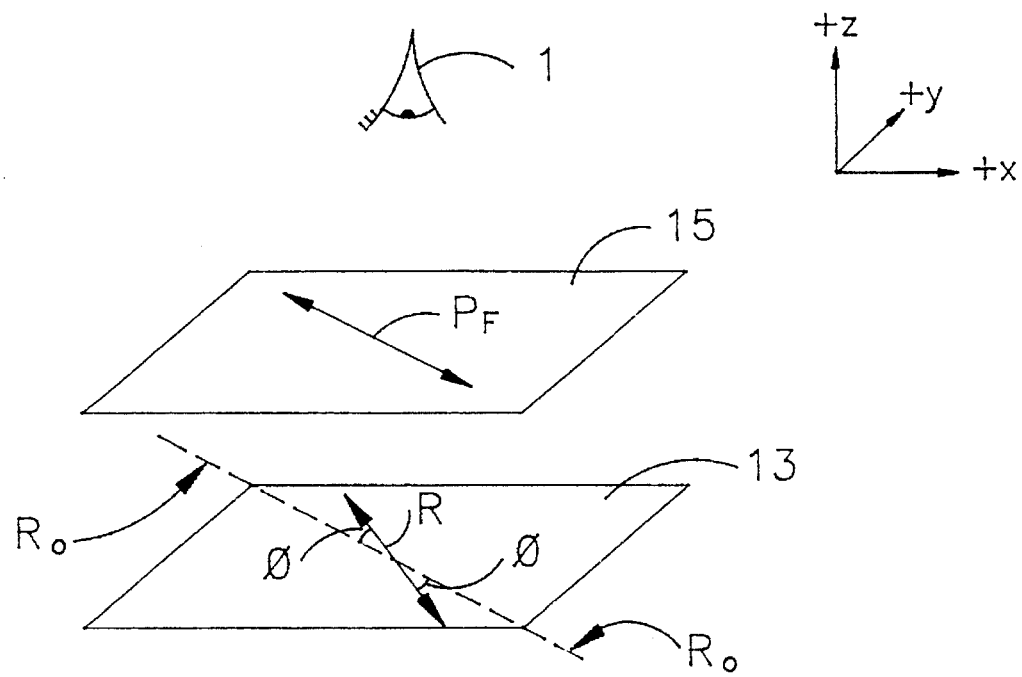
FIG. 4 is an exploded perspective schematical diagram of the optical components and their respective orientations of an LCD according to a first embodiment of this invention.
Figure 4:
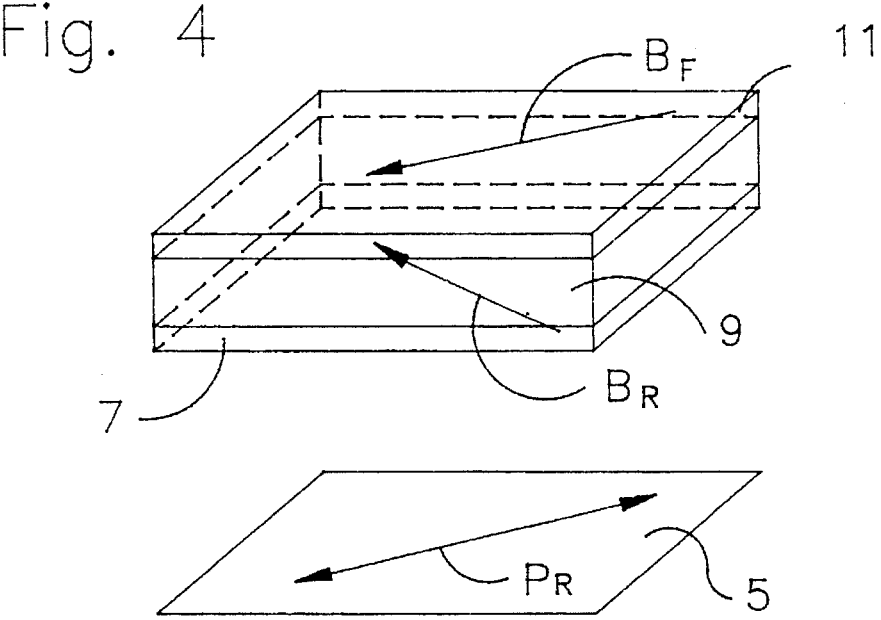
Figure 4:
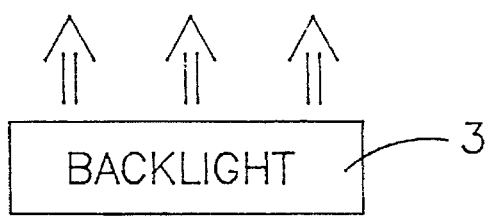

FIG. 4 is an exploded schematic view of the optical components and their respective orientations of an LCD according to a first embodiment of this invention, the LCD being an AMLCD having a matrix array of pixels and colored subpixels in certain embodiments. As shown, this display (or display assembly) includes from the rear forward toward viewer 1, conventional backlight 3, rear or light-entrance linear polarizer 5, rear buffing or orientation film 7, liquid crystal layer 9, front buffing or orientation film 11, retardation film 13, and finally front or light-exit linear polarizer 15.

Backlight 3 is conventional in nature and emits substantially collimated or alternatively diffused toward the display panel including rear polarizer 5 in certain embodiments of this invention. Backlight 3 may be, for example, the backlighting assembly disclosed in commonly owned U.S. Pat. No. 5,161,041, the disclosure of which is hereby incorporated herein by reference. Other conventional high intensity substantially collimated backlight assemblies may also be used.

Rear and front polarizers 5 and 15 are linear in nature in certain embodiments of this invention and their respective linear transmission axes $P_R$ and $P_F$ are orientated such that the displays of the different embodiments are of the normally white (NW) type. Therefore, when a driving voltage below the threshold voltage $V_{th}$ is applied across liquid crystal layer 9, transmission axes $P_R$ and $P_F$ of polarizers 5 and 15 respectively are orientated such that the light emitted from backlight 3 proceeds through and is linearly polarized in direction $P_R$ by polarizer 5, is then twisted (e.g. about 80°–100°) by LC material 9, and finally exits polarizer 15 via transmission axis $P_F$ thus reaching viewer 1. The light reaches viewer 1 because its polarization direction upon reaching front polarizer 15 is similar to that of axis $P_F$. Thus, a NW display or pixel to which a voltage less than $V_{th}$ is applied is said to be in the "off-state" and appears white (or colored if colored filters are present) to the viewer.

However, when a substantial driving voltage (e.g. about 6 volts) is applied across selected NW pixels of the matrix array including liquid crystal layer 9, the light transmitted through rear polarizer 5 is not significantly twisted by LC layer 9 and thus is substantially blocked by front polarizer 15 due to the fact that the polarization direction of light reaching the interior surface of front polarizer 15 is substantially perpendicular to transmission axis $P_F$ thereby resulting in substantially no light reaching viewer 1 by way of the selected pixels to which the substantial driving voltage is applied. Thus, the selected pixels driven in the matrix array appear darkened to viewer 1, these pixels said to be in the "on-state". As will be appreciated by those of skill in the art, the amount of light reaching viewer 1 is dictated by the voltage applied to LC layer 9—the higher the driving voltage, the darker the selected driven pixel(s) appear.

In certain embodiments of this invention, transmission axis $P_R$ of rear polarizer 5 and transmission axis $P_F$ of front polarizer 15 are oriented in a manner substantially perpendicular to one another so as to define a normally white twisted nematic cell. However, polarizers 5 and 15 may be oriented in other conventional manners which also allow the cell or display to be of the normally white type.

Rear and front orientation or buffing films 7 and 11, respectively, are conventional and made of a substantially transparent polyimide in certain embodiments of this invention. Rear orientation film 7 is conventionally buffed or oriented in direction $B_R$ as shown in FIG. 4. Likewise, front film 11 is conventionally buffed in direction $B_F$. Buffing directions $B_R$ and $B_F$ are oriented substantially perpendicular to one another in certain embodiments of this invention so as to allow the molecules of liquid crystal layer 9 when in the off or non-driven state to be twisted from about 80°–100°, most preferably about 90°. The term "off-state" means that a voltage below the threshold voltage ($V_{th}$) is applied across LC layer 9.

Due to the orientation of buffing directions $B_R$ and $B_F$ of orientation films 7 and 11 respectively, the polarization direction of normally incident light emitted from backlight 3 reaching liquid crystal material 9 is twisted in a conventional manner by the liquid crystal molecules as it passes through layer 9, when, of course, the display (or selected pixels thereof) is in the off-state.

However, when a substantially full driving voltage, e.g. about 6 volts or above, is applied to liquid crystal layer 9 (or selected pixels thereof to form the intended image), the normally incident light from backlight 3 reaching layer 9 is permitted to pass therethrough while substantially maintaining its initial direction of polarization. This is due to the fact that when a voltage is applied across LC material 9, the LC molecules are caused to become substantially aligned with one another in the vertical direction as shown in FIG. 4. Therefore, little or substantially no twisting occurs when such a driving voltage (e.g. about 6 volts) is applied and thus the direction of polarization of light passing through layer 9 is substantially maintained.

The voltage amount applied across LC layer 9 determines the degree of twisting of the liquid crystal molecules and thus dictates the polarization direction of light emitted from the front or viewer side of layer 9. In turn, the polarization direction of light reaching polarizer 15 dictates the amount of light permitted to pass therethrough via axis $P_F$ and reach viewer 1 in that the closer aligned transmission axis $P_F$ and the polarization direction of light reaching polarizer 15, the more light which is allowed to pass and reach viewer 1.

While the application of voltage $>V_{th}$ to layer 9 causes the LC molecule to substantially align vertically, the LC molecules never completely stand on end or become perfectly aligned in the vertical direction as is known in the art. This gives rise to the need for retardation film(s).

Retardation film 13 in this first embodiment is disposed on the viewer side of liquid crystal layer 9 thereby being sandwiched between front polarizer 15 and front orientation film 11. Surprisingly, it has been found that the provision of retardation film 13 on a single side of twisted nematic LC layer 9 reduces inversion and improves viewing zone contrast ratios at large viewing angles when the retardation value of the film is reduced relative to the prior art to retardation values of from about 100–200 nm.

Retardation film 13 in certain embodiments of this invention is positively birefringent and uniaxial in nature, this film being obtained from, for example, Nitto Corporation, Japan, or Nitto Denko America, Incorporated, New Brunswick, N.J. as Model No. NRF-140 (140 nm retarder).

Alternatively, it is believed that biaxial retardation films having similar retardation values may also provide excellent results, such biaxial retardation films and values being disclosed in aforementioned U.S. Ser. No. 08/235,691 filed Apr. 29, 1994.

With reference to FIGS. 4–5, axis $P_R$ and direction $B_F$ are substantially parallel to one another in certain embodiments of this invention while direction $B_R$, axis $P_F$, and direction R (or $R_0$) are also substantially parallel ± about 5° to one another. Accordingly, in such embodiments, axis $P_R$ and direction $B_R$ are substantially perpendicular to one another as are axis $P_F$ and direction $B_F$. A display having such an optical arrangement is said to be "X-buffed". The term "X-buffed" means that rear polarizer axis $P_R$ is substantially perpendicular to rear buffing direction $B_R$ while front polarizer axis $P_F$ is substantially perpendicular to front buffing direction $B_F$. Thus, the first embodiment of this invention illustrated in FIGS. 4–6 is an LCD of the "X-buffed" type.

Alternatively, an LCD may be "P-buffed" instead of "X-buffed" in certain embodiments, "P-buffed" meaning that rear polarizer axis $P_R$ is substantially parallel to rear buffing direction $B_R$ and front polarizer axis $P_F$ is substantially parallel to front buffing direction $B_F$.

Optical axis R of retardation film 13 in the first embodiment of this invention (see FIGS. 4–6) may be aligned in direction $R_0$ so as to be substantially parallel to axis $P_F$ and buffing direction $B_R$. Alternatively, optical axis R of retardation film 13 may be rotated either clockwise or counterclockwise relative to directions $R_0$ and $B_R$.

The effect of rotating optical axis R of film 13 relative to direction $R_0$ is to shift the viewing zone or envelope of the display vertically into either the upper or lower vertical region as will be further discussed in the examples below. When film 13 is disposed forward of LC layer 9 and optical axis R of retardation film 13 is rotated clockwise relative to direction $R_0$ (as shown in FIGS. 4–5) so as to define angle Θ therebetween, the high contrast viewing envelope of the display is shifted into the upper or positive vertical region so as to provide viewer 1 with a high contrast ratio image at increased positive vertical viewing angles. To achieve such a high quality shifted image in the positive vertical region, optical axis R of retardation film 13 is rotated clockwise (to define Θ) from about 2° –20° relative to $R_0$, more preferably about 4° –15°, and most preferably from about 6°–10° in certain embodiments of this invention. The term "clockwise" is defined as being viewed from the position of viewer 1 in FIG. 4 (or as shown in FIGS. 4–5).

Alternatively, optical axis R of film 13 may be rotated counterclockwise relative to direction $R_0$ so as to shift the high contrast viewing envelope of the display into the negative vertical viewing region when film 13 is positioned forward of LC layer 9. The same degrees of rotation discussed above relative to clockwise rotation of axis R also apply to this alternative counterclockwise rotation of optical axis R relative to directions $R_0$ and $B_R$.

The ability to shift the viewing zone vertically via rotation of film 13 is advantageous in that it allows for excellent positive or negative vertical viewing characteristics in situations where they are needed. Thus, if a customer desires good positive vertical viewing, the manufacturer need simply rotate optical axis R of retardation film 13 in the clockwise direction as discussed above.

The retardation value "d·Δn" of retardation film 13 is a critical parameter in achieving the surprising results of the different embodiments of this invention, where "d" is the thickness of the retardation film and "Δn" is its birefringent value. In certain embodiments, retardation film 13 is of the uniaxial positively birefringent type and has a retardation value of from about 100–200 nm, more preferably from about 110–180 nm, and most preferably from about 120–160 nm. The biaxial retardation values of the biaxial retarders disclosed in Ser. No. 08/235,691 will also suffice in certain embodiments.

FIG. 6 is a side elevational cross-sectional view of the NW liquid crystal display of the first embodiment of this invention. As shown, the display includes the optical elements illustrated in FIGS. 4–5 as well as rear transparent substrate 17, front transparent substrate 19, rear electrode 21, and front electrode 23.

Transparent substrates 17 and 19 are made of glass or transparent plastic in certain embodiments of this invention, rear substrate 17 being sandwiched between rear polarizer 5 and rear electrode 21 and front transparent substrate 19 being disposed between front electrode 23 and retardation film 13. Alternatively, retardation film 13 may be disposed interior substrate 19 as opposed to its exterior position shown in FIG. 6.

Rear and front electrodes 21 and 23 are conventional in nature and made of transparent ITO in certain embodiments of this invention. While electrodes 21 and 23 are both shown in FIG. 6 as being continuous in nature, rear electrode 21 in AMLCD applications may be conventionally segmented into a number of different pixel or colored subpixel electrodes. In such AMLCDs, each pixel or colored subpixel may be individually addressed via a corresponding conventional a-Si TFT or diode.

For example, electrode 21 may be divided into thirty separate and independent subpixel electrodes, ten of which are associated with corresponding blue filters (not shown) so as to define blue subpixels, another ten of which are associated with corresponding red filters (not shown) thereby defining red subpixels, and the remaining ten being associated with green color filters (not shown) so as to define green subpixels. The color filters (not shown) are disposed on the opposing side of LC layer 9 with respect to the segmented electrodes. In such an arrangement, the thirty subpixels may make up ten pixels, each pixel having a red, green, and blue subpixel therein arranged in a triangular fashion in certain embodiments.

With reference to FIGS. 4–6, in a typical operation of this first embodiment, the display operates as follows. White light is first emitted from conventional collimating backlight 3 and directed toward the rear side of the display panel. The light from backlight 3 hits rear polarizer 5 and is linearly polarized in accordance with polarization axes $P_R$. After being initially polarized, the linearly polarized light proceeds through rear transparent substrate 17, rear electrode(s) 21, and rear buffing or orientation film 7 before reaching liquid crystal layer 9.

When liquid crystal layer 9 is in the off-state, the light proceeding therethrough is twisted (preferably about 90°) before exiting layer 9 and reaching front buffing film 11. However, when LC layer 9 has a voltage (e.g. about 6 volts)

above $V_{th}$ applied thereto and is therefore in the on-state, the polarization direction of the light reaching its rear surface remains substantially unchanged as it proceeds through layer 9 and exits its front surface adjacent front orientation film 11 because the application of voltage across layer 9 causes the LC molecules thereof to become substantially aligned vertically or "stand up" as known in the art. Accordingly, the polarization direction of the light exiting LC layer 9 depends upon the voltage applied across the liquid crystal material—the higher the voltage, the more the LC molecules become aligned and the less twisting which occurs.

After exiting the front or exit side of liquid crystal layer 9, the light proceeds through front orientation film 11, front transparent ITO electrode 23, subpixel color filters (not shown) if present, and front transparent substrate 19 before reaching uniaxial retardation film 13. As the light proceeds through retardation film 13, the film conventionally introduces a phase delay that substantially restores the original polarization state of the light to what it was before it entered liquid crystal layer 9 (assuming the display is in the "on-state").

A need for retardation film 13 arises because when a driving voltage is applied across LC layer 9, the liquid crystal molecules become aligned vertically, but never completely. In other words, the liquid crystal molecules, even when a high driving voltage is applied thereto, are tilted slightly from the vertical. This inevitable tilting of the LC molecules creates the need for retardation film 13 which in effect produces a phase delay which reverses the effect caused by the non-perfect vertical alignment of the LC molecules.

After exiting retardation film 13, the light which originated from backlight 3 reaches the interior side of front linear polarizer 15. As discussed above, the polarization direction of the light reaching front polarizer 15 depends upon the driving voltage (or absence thereof) applied across liquid crystal layer 9. Thus, with respect to LC pixels of the matrix array in the off-state, the polarization direction of light reaching front polarizer 15 is substantially aligned with transmission axis $P_F$ which results in these off-state pixels appearing white or colored to the viewer.

However, with respect to on-state pixels in which a driving voltage>$V_{th}$ is applied across LC material 9, the polarization direction of light reaching front polarizer 15 is not substantially aligned with transmission axis $P_F$ thus resulting in on-state pixels appearing darkened to viewer 1 because polarizer 15 substantially blocks the light from reaching viewer 1. In such a manner, the application of predetermined driving voltages to selective pixels or colored subpixels results in desired images being displayed to viewer 1.

Figure 7:
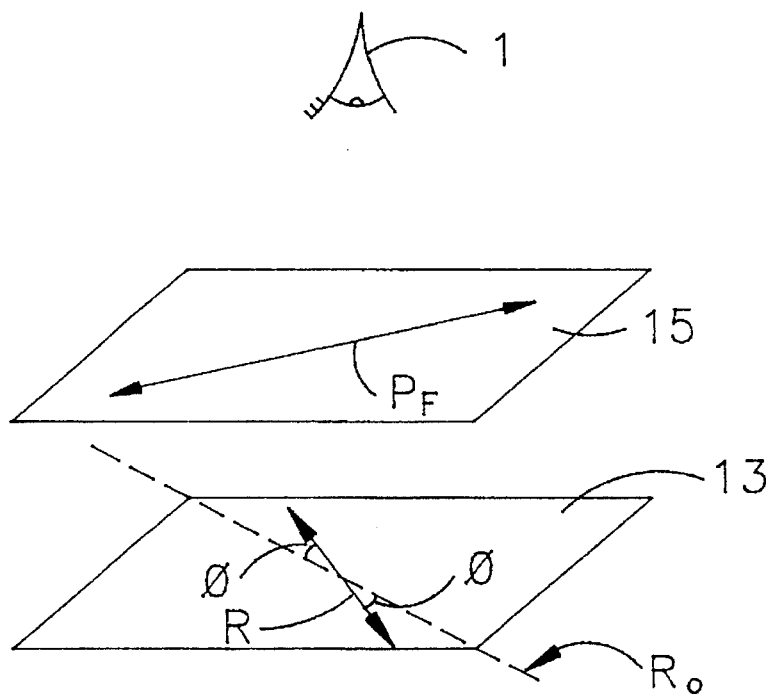
FIG. 7 is an exploded perspective schematical diagram of the optical components and their respective orientations of an LCD according to a second embodiment of this invention, this embodiment being "P-buffed" as opposed to the "X-buffed" first embodiment.
Figure 7:
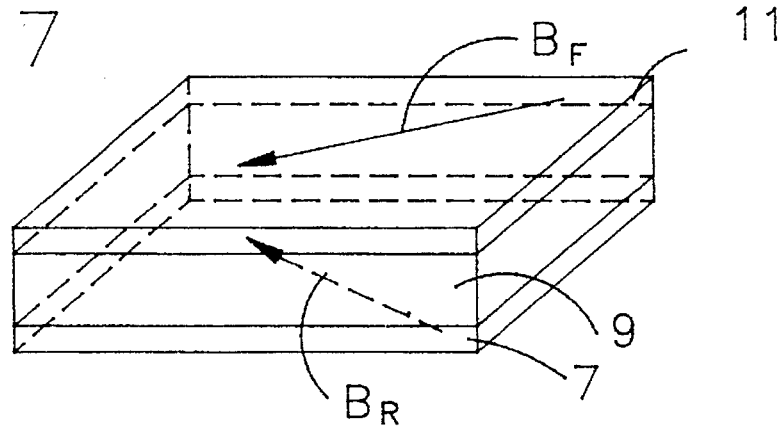
Figure 7:
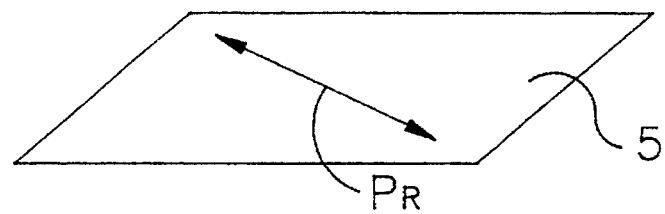
Figure 7:
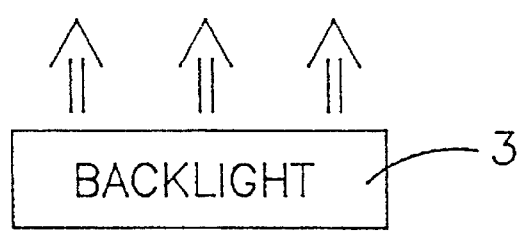

FIG. 7 is an exploded schematic view of the optical components and their respective orientations of an LCD according to a second embodiment of this invention. This second embodiment depicted in FIG. 7 differs from the first embodiment (FIGS. 4–6) in that the first embodiment is "X-buffed" and this second embodiment is "P-buffed". In other words, transmission axis $P_R$ of rear linear polarizer 5 in this embodiment is substantially parallel to buffing direction $B_R$ of rear orientation film 7, and transmission axis $P_F$ of front polarizer 15 is substantially parallel to buffing direction $B_F$ of front orientation film 11, thus defining a "P-buffed" display.

As will be appreciated by those of skill in the art, the display of the first embodiment may be adjusted so as to be transformed into the LCD of the second embodiment simply by rotating rear and front polarizers 5 and 15 respectively about 90° each, the rest of the cell such as LC layer 9, orientation films 7 and 11, retardation film 13, substrates 17 and 19, and electrodes 21 and 23 remaining substantially the same in both the first and second embodiments.

Figure 8:
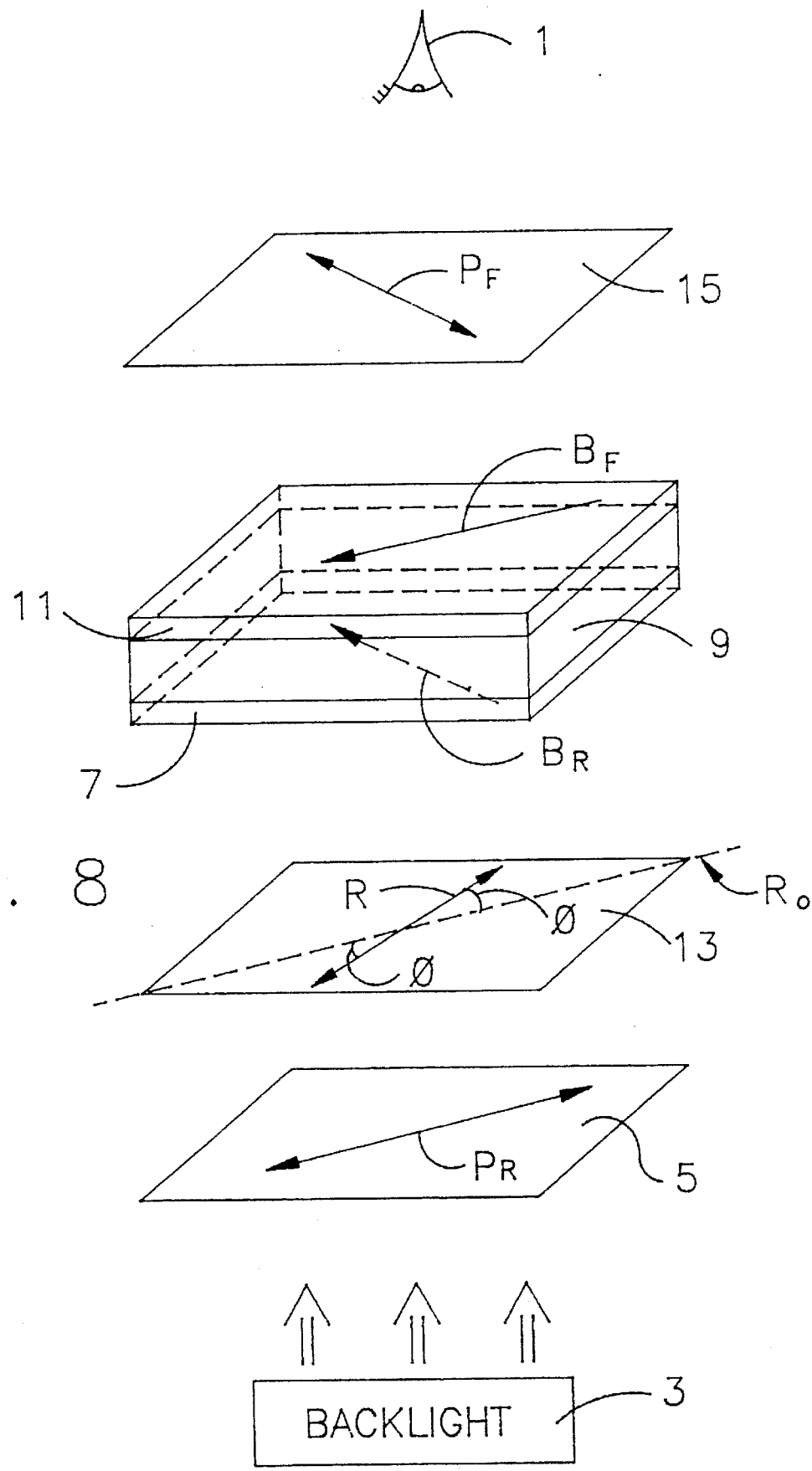
FIG. 8 is an exploded perspective schematical diagram of the optical components and their respective orientations of an LCD according to a third embodiment of this invention wherein the retardation film is disposed on the rear or backlight side of the liquid crystal layer.

FIG. 8 is an exploded schematic view of the optical components and their respective orientations of an "X-buffed" LCD according to a third embodiment of this invention. While both the first and third embodiments illustrated and described herein are "X-buffed" the principal difference therebetween is the position of retardation film 13. As shown in FIG. 8, retardation film 13 is disposed rearward or on the backlight side of liquid crystal layer 9 as opposed to its disposition on the front side thereof in the first embodiment of this invention.

A significant advantage associated with the positioning of retardation film 13 rearward of liquid crystal layer 9 is the reduction of ambient light reflection off of the front of the display panel, this reduction being attributed to fewer mismatching indices of refraction forward of liquid crystal layer 9 as discussed in aforesaid Ser. No. 08/235,691.

With respect to the third embodiment shown in FIG. 8, optical axis R of retardation film 13 may be rotated clockwise or counterclockwise relative to direction $R_0$ and buffing direction $B_F$, counterclockwise rotation causing the viewing envelope to shift into the upper or positive vertical region as in the first embodiment and clockwise rotation causing the envelope to shift into the negative or lower vertical viewing region. Therefore, if film 13 is disposed on the viewer side of liquid crystal layer 9, it must be rotated clockwise in order to shift the viewing envelope into the upper or positive vertical region, while if retardation film 13 is disposed rearward of liquid crystal layer 9 as in FIG. 8, counterclockwise rotation of optical axis R relative to directions $R_0$ and $B_F$ as shown in FIG. 8 will cause the viewing envelope to shift into the upper vertical region.

With respect to the optical components of the third embodiment, transmission axis $P_R$ of rear polarizer 5 is substantially parallel to direction $R_0$ and buffing direction $B_F$. Likewise, transmission axis $P_F$ of front polarizer 15 is substantially parallel to buffing direction $B_R$ of rear orientation film 7, buffing directions $B_F$ and $B_R$ being substantially perpendicular to one another. With respect to the retardation value of retarder 13, each of the first, second, and third embodiments utilize the aforediscussed retardation values.

This invention will now be described with respect to certain examples as follows:

EXAMPLE 1

In this first Example, three separate normally white a-Si TFT driven twisted nematic AMLCDs were manufactured and tested for purposes of comparison. The three AMLCDs are referred to in this Example as Display "A" Display "B" and Display "C" respectively. Each of the three AMLCDs of this Example utilized the same liquid crystal layer, RGB color filters, orientation films, electrodes, and transparent substrates. In other words, Displays "B" and "C" were constructed simply by adjusting or replacing the polarizers and/or retardation film 13.

The liquid crystal material of each display had a birefringence (ΔN) of about 0.084 at room temperature and was obtained from E. Merck Ltd. or its United States representative E.M. Industries, Inc., Hawthorne, N.Y. as Model No. ZLI-4718. Each of the three displays was tested at about 35°–45° C. The electrodes were conventional in nature and made of transparent ITO, the substrates were made of glass, and the buffing or orientation films were conventional in nature and made of a polyimide material. All three NW AMLCDs of this Example were of the RGB colored type and had red cell gaps "d" of about 5.6 μm, and green and blue cell gaps of about 5.3 μm, each pixel having a triad arrangement of RGB subpixels. White light emitted from conventional backlight 3 was utilized in all Examples herein.

The optical construction of Display "A" of this first Example is shown in FIGS. 4–6. NW Display "A" included from the rear forward toward viewer 1, conventional backlight 3, conventional linear polarizer 5 with transmission axis $P_R$, rear transparent glass substrate 17, rear segmented pixel and RGB subpixel electrodes 21, rear orientation film 7 having buffing direction $B_R$, liquid crystal layer 9, front orientation film 11 having buffing direction $B_F$, front electrode 23, RGB color filters (not shown) corresponding to each subpixel segment of electrode 21, front transparent glass substrate 19, uniaxial positively birefringent retardation film 13 having optical axis R, and finally front linear polarizer 15 having transmission axis $P_F$.

With respect to Display "A", transmission axis $P_R$ of rear polarizer 5 was substantially parallel to buffing direction $B_F$ of front orientation film 11. Also, transmission axis $P_F$ of front polarizer 15 was substantially parallel to rear buffing direction Be of orientation film 7 thus defining an "X-buffed" AMLCD, buffing directions $B_F$ and $B_R$ being substantially perpendicular to one another.

Retardation film 13 was positively birefringent and had a retardation value of 140 nm. Optical axis R of retardation film 13 was rotated about 8.5° in the clockwise direction relative to axis $P_F$ and direction Be so as to define Θ as shown in FIGS. 4–5 as about 8.5°. Retardation film 13 of Display "A" was obtained from Nitto Corporation, Japan, or Nitto Denko America, New Brunswick, N.J., as Model No. NRF140.

Rear and front linear polarizers 5 and 15 of all Examples herein were conventional in nature and obtained from Nitto Denko America, Model No. G 1220DUN.

FIG. 9 is a contrast ratio contour plot of Display "A" of this Example when a driving voltage of about 6.8 volts was applied thereto and white light was emitted from backlight 3. As shown, the high contrast viewing zone was shifted vertically into the positive vertical region (above the 0° vertical viewing axis) by the aforesaid clockwise rotation of optical axis R of retardation film 13. This display had at least about a 10:1 contrast ratio at +10° vertical over a total range of about 110° horizontal, this being an improvement of about 40° with respect to the light valve of prior art FIG. 1 at the same 10° vertical viewing axis. In a similar manner, Display "A" had at least about a 10:1 contrast ratio at +50° vertical that extended over a total of about 95° horizontal, this 95° horizontal range being a significant improvement over the contrast ratio at 50° vertical with respect to the light valve of FIG. 1.

As shown, the viewing zone or envelope of Display "A" when about 6.8 volts was applied thereto was fairly uniform (or unskewed) in nature. Additionally, high contrast ratios (e.g. 50:1) of Display "A" extended over significantly greater horizontal and vertical expanses than did their corresponding ratios in the light valve of prior art FIG. 1. For Example, the 50:1 contrast ratio of Display "A" at +10° vertical extended over a total of about 80° horizontal as shown in FIG. 9, while the corresponding 50:1 contrast ratio curve in prior art FIG. 1 at 10° vertical extended only over about 40° horizontal. Thus, it is evident that the addition of retardation film 13 with its corresponding retardation value and optical orientation resulted in a significant improvement with respect to contrast ratio.

FIG. 10 is a contrast ratio contour plot of Display "A" of this Example when a 6.0 volt driving voltage was applied thereto. As shown, the slight reduction in driving voltage resulted in the contrast ratio contours slightly shrinking horizontally in the extreme upper vertical viewing region (e.g. 60° vertical).

Figure 2:
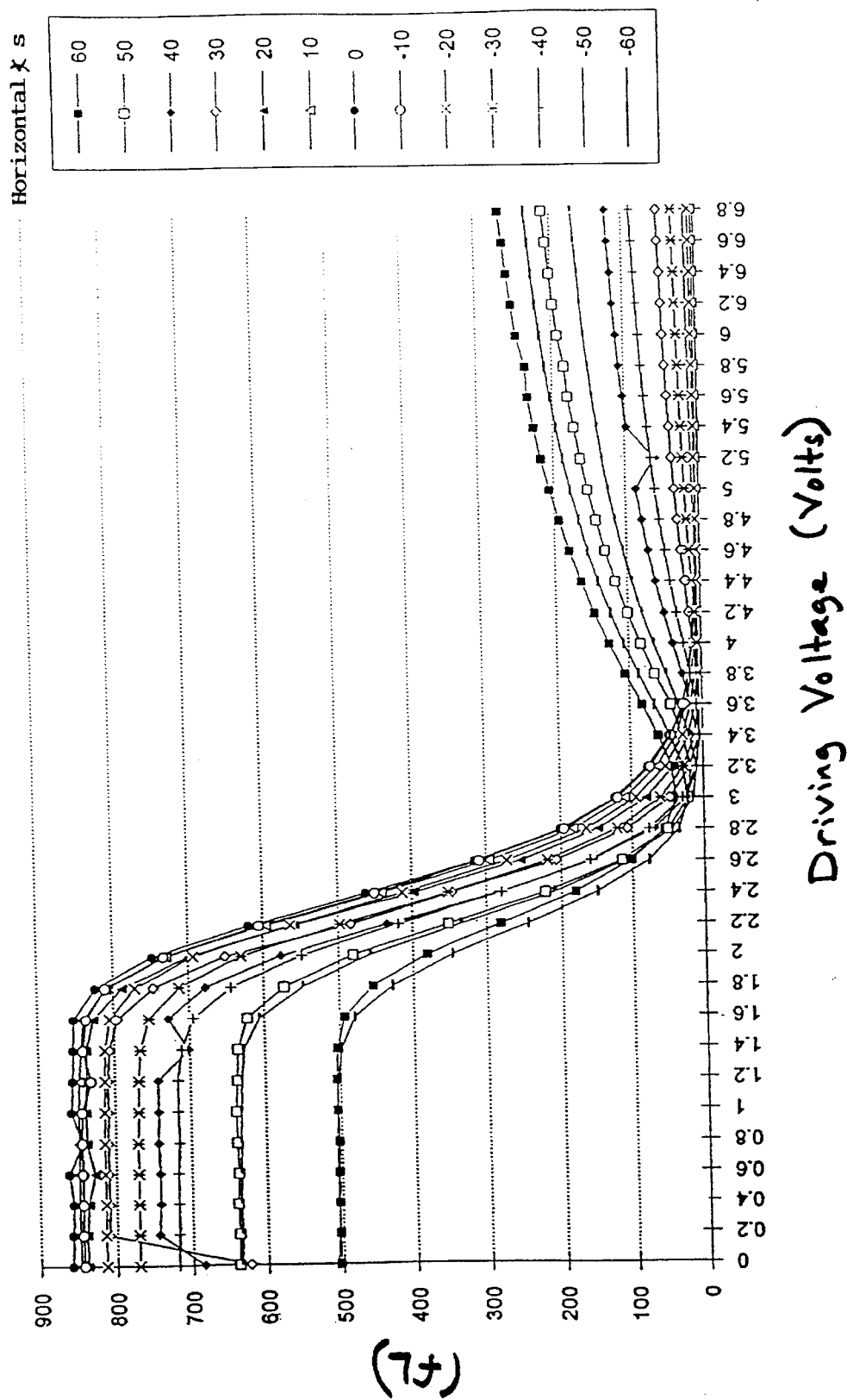
FIG. 2 is an intensity versus driving voltage plot of the prior art light valve of FIG. 1, this plot illustrating a fairly large amount of undesireable inversion over a wide range of horizontal viewing angles at driving voltages greater than about 3 volts.
Figure 3:
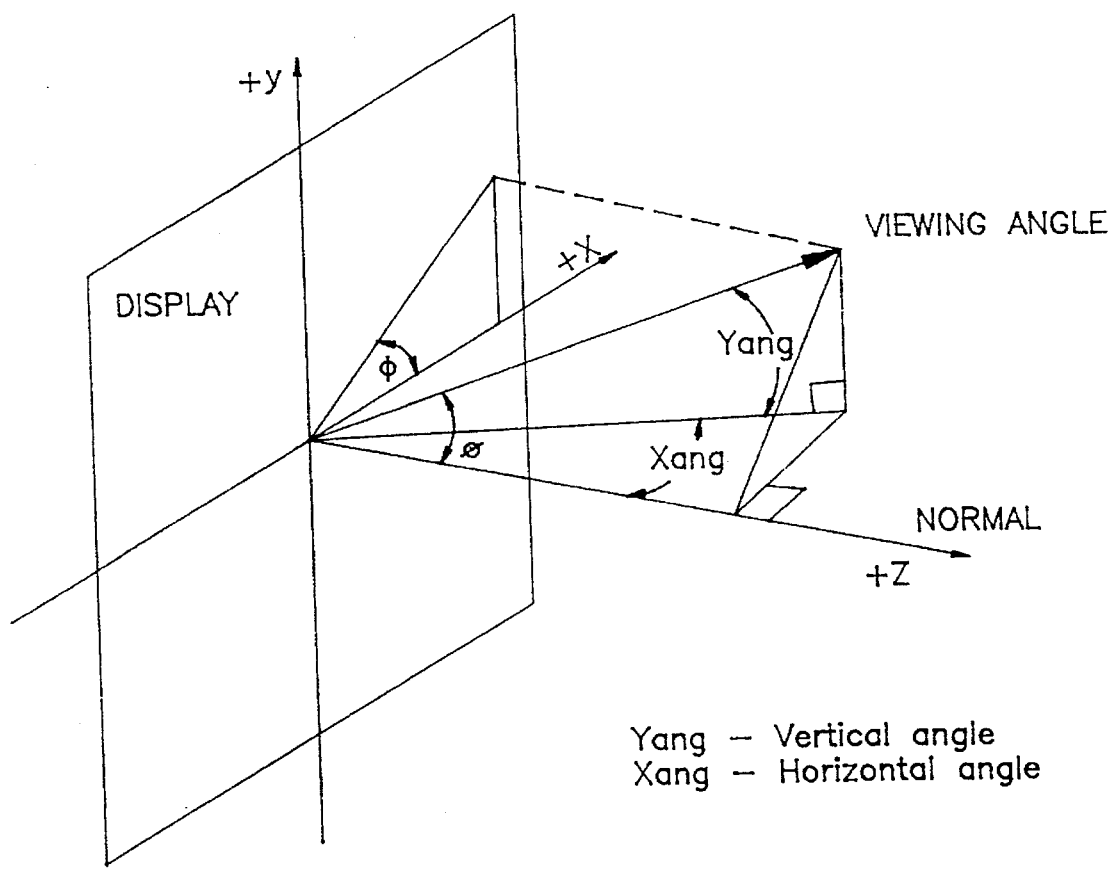
FIG. 3 is a graph illustrating the angular relationship between the horizontal and vertical viewing angles discussed herein, and their relationship with conventional liquid crystal display viewing angles: azimuthal angle $\phi$; and polar angle $\Theta$.

FIG. 11 is an intensity (fL) vs driving voltage plot of Display "A". As shown, Display "A" had significantly reduced inversion with respect to that of the prior art light valve shown in FIG. 2. This is evident by the substantial elimination of the prior art inversion humps present at about 3.0 volts and greater. No such inversion humps are shown in FIG. 11 thus illustrating the significant improvement over the prior art with respect to inversion at the illustrated horizontal viewing angles along the 0° vertical viewing axis. The elimination of the inversion humps of the prior art allows Display "A" to be easily and effectively driven with a plurality of gray level driving voltages while allowing viewers at different viewing angles to see substantially the same image with respect to color and other important viewing characteristics.

FIG. 12 (a) is a contrast ratio contour plot of NW a-Si TFT driven "X-buffed" Display "B" of this Example, Display "B" being manufactured and tested for purposes of comparison with Display "A". As stated above, Display "B" was manufactured utilizing the same liquid crystal material, electrodes, RGB color filters, orientation films, TFTs, and transparent substrates as Display "A". The only difference between Display "A" and Display "B" was that the retardation value of uniaxial positively birefringent retardation film 13 of Display "B" was about 350 nm instead of the 140 nm value of Display "A" and optical axis R of retardation film 13 was substantially parallel to directions $R_0$ and $B_R$. Thus, by comparing the results of displays "A" and "B", one may easily see the improvement resulting from the use of a retardation value in the range of about 100–200 nm (e.g. 140 nm) as opposed to retardation values greater than about 300 nm.

As shown in FIG. 12(a) the high contrast viewing envelope of the 350 nm retardation film Display "B" was significantly smaller with respect to contrast ratio than was that of Display "A" shown in FIG. 9. By comparing FIGS. 9 and 12(a), it is clear that use of the higher value retardation film resulted in a smaller viewing envelope both vertically and horizontally.

Further evident from comparing FIGS. 9 and 12(a) is the fact that Display "A" had higher contrast ratios (e.g. 50:1 and greater) over a larger range of viewing angles than did Display "B" thus resulting in improved viewing characteristics. Thus, this additional advantage associated with the lower value retardation film is clear.

FIG. 12(b) is a contrast ratio contour plot of NW a-Si TFT driven Display "C" of this Example. Display "C" differed from Display "A" in that Display "C" was "P-buffed" as shown in FIG. 7 (instead of "X-buffed") and utilized a uniaxial positively birefringent retardation film 13 having a retardation value of about 350 nm. Furthermore, optical axis R of retardation film 13 in Display "C" was substantially parallel to axis $P_R$ and direction $B_R$ (Θ=about 0°).

All three NW AMLCDs of this Example had their respective retardation films disposed on the forward or viewer side of liquid crystal material 9 and sandwiched between front substrate 19 and front polarizer 15.

Display "C" which is similar to NW displays described in U.S. Pat. No. 5,184,236, had its contrast ratio contour plot illustrated when about 6.0 volts was applied thereto in FIG. 12(*b*). As shown in FIG. 12(*b*) as compared to FIG. 9, Display "C" had significantly lower contrast ratio expanses both vertically and horizontally than did Display "A". Additionally, the extent of higher contrast ratios (e.g. 50:1) in Display "A" was greater than that of Display "C" as is evident by comparing FIG. 9 with FIG. 12(*b*).

The orientations of retardation film optical axis R in Displays "A", "B", and "C", of course, resulted in the viewing envelopes of Displays "B" and "C" not being shifted vertically as was the envelope of Display "A".

EXAMPLE 2

A "P-buffed" normally white twisted nematic light valve was manufactured and tested at about 35°–40° C. in this Example. This light valve had optical orientations similar to those shown in FIG. 7 and included from the rear forward toward viewer 1 conventional backlight 3, rear linear polarizer 5 with transmission axis $P_R$, rear transparent glass substrate 17, rear continuous electrode 21, rear orientation film 7 with buffing direction $B_R$, liquid crystal layer 9 having a thickness or cell gap "d" of about 5.86 µm, front orientation film 11 with buffing direction $B_F$, front continuous electrode 23, front transparent glass substrate 19, uniaxial positively birefringent retardation film 13 having a retardation value of about 120 nm, and finally front linear polarizer 15 having transmission axis $P_F$.

Retardation film 13 had its optical axis R rotated clockwise about 20° relative to directions $R_0$ and $B_R$ so as to shift the viewing envelope into the positive vertical viewing region. In other words, Θ equaled about 20° as shown in FIG. 7.

Retardation film 13 of this Example was positively birefringent, uniaxial, and was obtained from Nitto Denko America, New Brunswick, N.J., Model No. NRF120. The liquid crystal material was identical to the type utilized in the displays of Example 1, as were the polyimide orientation films, glass substrates, and polarizers. Because this Example utilized a light valve, both electrodes 21 and 23 were continuous in nature as opposed to the segmented design of the rear electrode of each AMLCD in Example 1.

FIG. 13 is a contrast ratio contour plot of the NW light valve of Example 2 when about a 5.0 volt driving voltage was applied thereto. As shown, the 20° clockwise rotation of optical axis R of retardation film 13 resulted in the shifting of the viewing zone or envelope into the positive vertical region as is evident by FIG. 13. Furthermore, the use of the 120 nm retardation film resulted in high contrast ratios over a wide range of horizontal and vertical viewing angles as shown. Thus, the advantages of such a retardation value and the 20° rotation of optical axis R are self-evident in view of the superior viewing characteristics exhibited.

FIG. 14 is a contrast ratio contour plot of the NW light valve of this Example when about a 4.0 volt driving voltage was applied. As shown, the viewing zone remained in the upper or positive vertical region and was substantially uniform and unskewed in nature.

An advantage of particular interest associated with the light valve of this Example is its good contrast at driving voltages of about 4–5 volts. Certain driver chips often do not allow displays to be driven above 6 volts. In other words, such chips provide for maximum driving voltages of only about 6 volts, this meaning that many of the gray level driving voltages are around 4–6 volts. Therefore, the superior contrast behavior of this light valve at such driving voltages is a distinct advantage. The better behavior of this light valve at lower driving voltages is clearly an improvement over the prior art.

EXAMPLE 3

A normally white a-Si TFT driven twisted nematic AMLCD of the P-buffed type was manufactured and tested at about 35°–40° C. in this Example. The liquid crystal material was the same as discussed above in Examples 1 and 2, with this AMLCD having a cell gap "d" of about 5.3 µm in each of the red, green, and blue subpixels. Each pixel of this AMLCD included an RGB triad of subpixels. Unlike the other Examples herein, this AMLCD was driven with a conventional Gross Tester in that all column and row address lines were driven together.

As shown generally in FIG. 7, the AMLCD of Example 3 included from the rear forward conventional backlight 3, conventional polarizer 5 having transmission axis $P_R$, transparent rear glass substrate 17, transparent ITO segmented subpixel or pixel electrodes 21, rear orientation film 7 having buffing direction $B_R$, liquid crystal layer 9 having a RGB cell gap of about 5.3 µm, front orientation film 11 with buffing direction $B_F$, front continuous electrode 23, red, green, and blue color filters (not shown) corresponding to each subpixel electrode segment, front transparent glass substrate 19, uniaxial positively birefringent retardation film 13 having a retardation value of about 140 nm, and finally front linear polarizer 15 having transmission axis $P_F$.

Retardation film 13 was again obtained from Nitto Denko America, New Brunswick, N.J., as Model No. NRF140 and was oriented such that its optical axis R was rotated clockwise about 5° relative to direction $B_R$ and axis $P_R$. In other words, Θ as shown in FIG. 7 was about 5°.

As shown in FIG. 15, the AMLCD of this Example had its viewing zone or envelope shifted into the positive vertical region by the 5° rotation of retardation film axis R, the viewing envelope being substantially uniform in nature as shown.

This concludes the Examples herein.

As is evident from the results of the aforesaid Examples, the provision of a retardation film having a retardation value of from about 100–200 nm (or 100–250 nm) on a single side of the liquid crystal layer significantly improves the viewing characteristics of a display with respect to both contrast ratio and inversion. As will be appreciated by those of skill in the art, the provision of a normally white twisted nematic LCD having an enlarged and vertically shiftable viewing zone with reduced inversion is a significant improvement over conventional normally white LCDs, this improvement allowing the substantially cheaper to manufacture NW displays to take the place of more expensive normally black displays.

Furthermore, the ability to shift the viewing zone vertically into either the positive or negative vertical viewing region allows the manufacturer to custom make or tailor each AMLCD according to the needs of specific customers. For Example, one customer may require an AMLCD to be mounted in the lower portion of an avionic cockpit such that the pilot is forever looking downward at the display thus requiring the AMLCD to have high contrast ratios and reduced inversion in the upper or positive vertical region. In such a case, the desired viewing characteristics may be achieved simply by rotation of retardation film 13 as discussed above. Thus, the designs of the different embodiments of this invention allow different specifications to be realized.

The pre-tilt angle of the displays and light valves herein may be about 3° in certain embodiments, and the value of "d/p" (thickness/natural pitch of the liquid crystal material) of the liquid crystal layers may be set to about 0.25.

Once given the above disclosure, many other features, modifications, and improvements will become apparent to the skilled artisan. Such other features, modifications, and improvements are, therefore, considered to be a part of this invention, the scope of which is to be determined by the following claims:

We claim:

1. A twisted nematic liquid crystal display capable of displaying an image to a viewer, said display comprising:

a pair of electrodes sandwiching a twisted nematic liquid crystal layer therebetween, said pair of electrodes for applying a voltage across said liquid crystal layer;

first and second orientation means disposed adjacent said liquid crystal layer on opposite sides thereof, said first orientation means defining a first orientation or buffing direction and said second orientation means defining a second orientation or buffing direction, said first and second orientation directions for aligning the liquid crystal molecules of said liquid crystal layer in a predetermined manner;

a positively birefringent uniaxial retardation film having a retardation value "d·Δn" in the range of about 100–200 nm, where "d" is the thickness of said retardation film and "Δn" is its birefringent value, wherein said retardation film is disposed on the same side of said liquid crystal layer as said first orientation means, said retardation film being oriented such that its optical axis is substantially parallel plus or minus about 25° to the second orientation or buffing direction of said second orientation means thereby enabling said liquid crystal display to display to the viewer an image with improved contrast ratios and reduced inversion.

2. The display of claim 1, wherein said optical axis of said retardation film is rotated relative to said second orientation or buffing direction, whereby said rotation of said optical axis shifts the display's high contrast ratio viewing zone or envelope vertically so as to allow the viewer to view said image at increased vertical viewing angles and wherein the display is of the normally white type and the thickness of said liquid crystal layer is from about 4.8–6.0 μm and the Δn of said liquid crystal layer is from about 0.075 to 0.095 at room temperature.

3. The display of claim 2, wherein said optical axis of said retardation film is rotated from about 2°–20° relative to said second orientation or buffing direction, and wherein said retardation value of said retardation film is from about 120–160 nm, and wherein said first and second directions are substantially perpendicular to one another.

4. The display of claim 3, wherein said retardation film and said first orientation means are disposed on the viewer side of said liquid crystal layer, and said optical axis of said retardation film is rotated clockwise relative to said second orientation or buffing direction so that the high contrast viewing zone is shifted to a position in the positive or upper vertical viewing region in order to enable viewers at high positive viewing angles to view images of high contrast, and wherein said liquid crystal layer twists at least one visible wavelength of light less than about 100° when said liquid crystal layer is in the off-state.

5. The display of claim 4, wherein the display outputs contrast ratios to the viewer of at least about 10:1 or 10 at viewing angles of about +20° vertical, ±45° horizontal when a driving voltage of greater than or equal to about 6 volts is applied to said liquid crystal layer.

6. The display of claim 5, wherein said display outputs a contrast ratio of at least about 30:1 at viewing angles at about +15° vertical over a total horizontal range of about 75° when greater than about a 6 driving voltage is applied to said liquid crystal layer; and wherein said optical axis of said retardation film is rotated from about 5°–10° in the clockwise direction relative to second orientation or buffing direction when viewed from the viewer side of said display.

7. A method of shifting the high contrast ratio viewing zone of a twisted nematic normally white liquid crystal display upward into the positive or upper vertical viewing zone, said method comprising the steps of:

a) sandwiching a twisted nematic liquid crystal layer between a pair of electrodes, said liquid crystal layer having a thickness of from about 4.5–6.5 μm;

b) orienting the liquid crystal molecules on a first side of said liquid crystal layer in a first direction;

c) orienting the liquid crystal molecules on a second side of said liquid crystal layer in a second direction, said first and second directions being different from one another in a manner such that said liquid crystal layer when in the off-state twists at least one visible wavelength of light less than about 100°;

d) providing a retardation film having a retardation value "d·Δn", in the range of about 100–250 nm on said first side of said liquid crystal layer, wherein "d" is the thickness of said retardation film and "Δn" is its birefringence;

e) rotating the optical axis of said retardation film from about 2°–20° relative to said second direction, said rotating of said optical axis shifting the high contrast viewing zone vertically so that viewers at such viewing angles may see a high contrast image with reduced inversion.

8. The method of claim 7, wherein said retardation value of said retardation film is from about 100–175 nm and said optical axis of said retardation film is rotated from about 4°–15° relative to said second direction.

9. The method of claim 8, wherein said first side of said liquid crystal layer is the side closest the viewer and said step e) further includes rotating said film such that said optical axis is rotated from about said 4°–15° in the clockwise direction relative to said second direction so as to position said high contrast viewing zone in the positive or upper vertical viewing direction, said clockwise direction being defined as viewed from the viewer side of said display.

10. The method of claim 8, wherein said first side of said liquid crystal layer is the side closest to a corresponding backlight and said step e) further includes rotating said retardation film such that said optical axis is rotated from about said 4°–15° in the counterclockwise direction relative to said second direction so as to position said high contrast viewing zone in the positive vertical viewing direction, said counterclockwise direction being defined as viewed from the viewer side of said display.

11. The method of claim 8, further comprising the steps of:

f) polarizing light emitted from a backlight in a first polarization direction by way of a rear polarizer disposed between said liquid crystal layer and said backlight;

g) polarizing said light in a second polarization direction as said light proceeds from said liquid crystal layer toward the viewer by way of a front polarizer disposed on the viewer side of said liquid crystal layer; and h) orienting said rear and front polarizers such that said first and second polarization directions define a normally white liquid crystal display whose pixels or colored subpixels appear darkened in the "on-state" and substantially light in the "off-state."

12. The method of claim 11, wherein said optical axis is rotated from about 6°–10° relative to said second direction so as to allow said display to display an image with good contrast ratios and reduced inversion, and wherein said $\Delta n$ of said liquid crystal layer is from about 0.075 to 0.095.

13. A method of making a normally white twisted nematic liquid crystal display, the method comprising the steps of:

a) sandwiching a liquid crystal layer between first and second electrodes, said liquid crystal layer having a thickness "d" of from about 4.5 to 6.5 µm;

b) providing a first orientation means between said first electrode and said liquid crystal layer, said first orientation means for orienting LC molecules of said LC layer in a first direction adjacent said first orientation means;

c) providing a second orientation means between said LC layer and said second electrode, said second orientation means for orienting LC molecules in a second direction adjacent said second orientation means;

d) disposing a positively birefringent uniaxial retardation film on the same side of said LC layer as said first electrode and first orientation means, said retardation film having a retardation value of from about 100–200 nm; and e) orienting the optical axis of said uniaxial retardation film substantially parallel ± about 20° to said second direction defined by said second orientation means whereby said normally white display exhibits improved contrast ratios and reduced inversion.

* * * * *